United States Patent
Hirooka et al.

(10) Patent No.: US 11,467,560 B2
(45) Date of Patent: Oct. 11, 2022

(54) ENGINEERING SUPPORT SYSTEM AND ENGINEERING SUPPORT METHOD

(71) Applicant: YOKOGAWA ELECTRIC CORPORATION, Tokyo (JP)

(72) Inventors: Isao Hirooka, Tokyo (JP); Tatenobu Seki, Tokyo (JP); Takahiro Kambe, Tokyo (JP); Yuta Machida, Tokyo (JP); Yuri Kimura, Tokyo (JP); Masato Annen, Tokyo (JP); Nobuaki Ema, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 414 days.

(21) Appl. No.: 16/724,810

(22) Filed: Dec. 23, 2019

(65) Prior Publication Data
US 2020/0201285 A1  Jun. 25, 2020

(30) Foreign Application Priority Data
Dec. 25, 2018 (JP) .............................. JP2018-241195

(51) Int. Cl.
*G06F 30/00* (2020.01)
*G06V 30/422* (2022.01)
(Continued)

(52) U.S. Cl.
CPC ... *G05B 19/4097* (2013.01); *G06F 16/24522* (2019.01); *G06F 30/00* (2020.01);
(Continued)

(58) Field of Classification Search
None
See application file for complete search history.

(56) References Cited

U.S. PATENT DOCUMENTS

| 10,248,626 B1* | 4/2019 | Zhang | G06F 16/313 |
| 2006/0114252 A1* | 6/2006 | Ramani | G06F 16/532 |
| | | | 707/E17.03 |

(Continued)

FOREIGN PATENT DOCUMENTS

| EP | 3029535 A2 | 6/2016 |
| JP | 2859407 B2 | 2/1999 |
| JP | 3445470 B2 | 9/2003 |

OTHER PUBLICATIONS

Miriam Schleipen et al., "Domain dependant matching of MES knowledge and domain independent mapping of AutomationML models," Processing of 2012 IEEE 17th International Conference on Emerging Technologies & Factory Automation (ETFA 2012); Krakow, Poland, Sep. 17, 2012 to Sep. 21, 2012; pp. 1-7; XP032350203 (7 pages).

(Continued)

*Primary Examiner* — Joni Hsu
(74) *Attorney, Agent, or Firm* — Osha Bergman Watanabe & Burton LLP

(57) ABSTRACT

An engineering support system that supports engineering of a process control system, includes: a storage; and a processor connected to the storage and that: transforms design drawings into semantic models and outputs the semantic models to the storage; and generates a combined semantic model by combining the semantic models based on a degree of similarity among the semantic models and outputs the combined semantic model to the storage, wherein each of (Continued)

the semantic models is expressed by first information indicating elements included in the design drawings and second information indicating a relationship between the elements.

8 Claims, 16 Drawing Sheets

(51) Int. Cl.
| | |
|---|---|
| G05B 19/4097 | (2006.01) |
| G06F 30/10 | (2020.01) |
| G06F 16/2452 | (2019.01) |
| G06F 111/20 | (2020.01) |
| G06F 111/00 | (2020.01) |
| G06V 10/74 | (2022.01) |
| G06T 17/00 | (2006.01) |

(52) U.S. Cl.
CPC ............ *G06F 30/10* (2020.01); *G06V 30/422* (2022.01); *G05B 2219/31342* (2013.01); *G05B 2219/42155* (2013.01); *G06F 2111/00* (2020.01); *G06F 2111/20* (2020.01); *G06T 17/00* (2013.01); *G06V 10/74* (2022.01)

(56) References Cited

U.S. PATENT DOCUMENTS

| | | | |
|---|---|---|---|
| 2007/0112718 A1* | 5/2007 | Liu | G06N 5/02 706/47 |
| 2011/0218777 A1* | 9/2011 | Chen | G06F 30/00 703/1 |
| 2012/0095973 A1* | 4/2012 | Kehoe | G06F 8/70 707/694 |
| 2012/0109901 A1* | 5/2012 | Mase | G06F 16/58 707/E17.019 |
| 2018/0247209 A1 | 8/2018 | Lecue et al. | |

OTHER PUBLICATIONS

Peter Mell et al., "The NIST Definition of Cloud Computing." NIST Special Publication 800-145; Sep. 2011 (7 pages).

* cited by examiner

ENGINEERING SUPPORT SYSTEM AND ENGINEERING SUPPORT METHOD

CROSS-REFERENCE TO RELATED APPLICATIONS

This application is based on and claims priority under 35 U.S.C. § 119 from Japanese Patent Application No. 2018-241195 filed on Dec. 25, 2018, the contents of which are incorporated herein by reference.

BACKGROUND

Technical Field

The present invention generally relates to an engineering support system and an engineering support method.

Related Art

Conventional plants or factories (simply "plants" hereinbelow when referring to these generally) are constructed with a process control system of controlling various states and quantities (such as pressure, temperature, and flow rate) in an industrial process, and in such conventional plants, advanced automatic operations are performed. For example, a controller forming the core of the process control system acquires detection results of a plurality of sensors (such as a flowmeter and a thermometer), seeks an actuation amount of an actuator (such as a valve) according to these detection results, and actuates the actuator according to this actuation amount to control the various states and quantities above.

Most engineering for the construction, management, maintenance, repair, and the like of such a process control system is performed by a plurality of engineers using a large variety of design drawings, specifications, and the like ("design drawings and the like"). As these design drawings and the like, for example, a P&ID (piping and instrument diagram), a PFD (process flow diagram), a device list, device setting information, a CAD (computer-aided design) drawing, a control logic diagram, a simulation model, and a graphic drawing can be mentioned. Note that above, "engineering" refers to work relating to the construction, modification, maintenance, and the like of the system.

In the process control system, a plurality of components is closely associated, such that when a portion of the components changes, other components may also need to be changed. As such, for efficient engineering of the process control system, it is crucial to share design drawings and the like that reflect actual conditions (such as an actual configuration and actual settings) of the process control system among the engineers involved in the engineering. Patent literature 1 below discloses a maintenance and management system that enables central management of maintenance and management work of a plant. Moreover, patent literature 2 below discloses a maintenance information management support device that supports workers by accurately and speedily grasping implementation conditions by managing implementation conditions of modification construction relating to plant facilities.

Patent Literature 1: JP 2859407 B2
Patent Literature 2: JP 3445470 B2

For efficient engineering of the process control system, as above, it is ideal to share the design drawings and the like reflecting the actual conditions of the process control system among the engineers involved in the engineering in a usable form. However, in reality, the design drawings and the like reflecting the actual conditions of the process control system are not sufficiently shared among the engineers involved in the engineering, and reusing these is cumbersome; currently, it is hard to say that this work is very efficient.

SUMMARY

One or more embodiments of the invention provide an engineering support system and an engineering support method whereby working efficiency can be significantly improved by associating and integrating various information used in engineering.

An engineering support system according to one or more embodiments provides an engineering support system (1) that supports engineering of a process control system, provided with a transformation unit (10) that transforms design drawings and the like (DD) used in engineering the process control system into a semantic model (M) expressed by first information indicating elements included in the design drawings and the like and second information indicating a relationship between the elements and a combined semantic model generation unit (31) that generates a combined semantic model (CM) that combines a plurality of semantic models based on a degree of similarity between a plurality of semantic models.

Furthermore, an engineering support system of one or more embodiments is further provided with a similarity calculation unit (32) that calculates the degree of similarity, wherein the combined semantic model generation unit generates the combined semantic model based on the degree of similarity calculated by the similarity calculation unit.

Furthermore, in an engineering support system of one or more embodiments, the degree of similarity indicates a degree of similarity between the first information included in the plurality of semantic models and a degree of similarity between the second information included in the plurality of semantic models.

Furthermore, in an engineering support system of one or more embodiments, the first information includes information indicating names of the elements and information indicating properties of the elements.

Furthermore, an engineering support system of one or more embodiments is further provided with a semantic model information extraction unit (34) that extracts an extracted semantic model according to an instruction from the combined semantic model, wherein the transformation unit transforms the extracted semantic model (EM) extracted by the semantic model information extraction unit into the design drawings and the like.

Furthermore, an engineering support system of one or more embodiments is further provided with a first database (33) that stores calculation rules of the similarity, wherein the similarity calculation unit calculates the degree of similarity between the plurality of semantic models according to the calculation rules stored in the first database.

Furthermore, an engineering support system of one or more embodiments is further provided with a second database (12) that stores rules for transformation between the design drawings and the like and the semantic model, wherein the transformation unit transforms the design drawings and the like into the semantic model and transforms the semantic model into the design drawings and the like according to the transformation rules stored in the second database.

Furthermore, an engineering support system of one or more embodiments is further provided with a third database (35) that stores extraction rules for extracting the semantic model from the combined semantic model, wherein the semantic model information extraction unit extracts a semantic model necessary to create design drawings and the like of an instructed type in an instructed range according to the extraction rules stored in the third database.

Furthermore, an engineering support system of one or more embodiments is further provided with an application unit (40) that corrects the semantic model, supports correction of the semantic model, or compares a plurality of semantic models or a plurality of combined semantic models.

Furthermore, an engineering support system of one or more embodiments is further provided with a storage unit (20) that stores the semantic model and the combined semantic model.

An engineering support method of one or more embodiments is an engineering support method of supporting engineering of a process control system, having a first transformation step (S11) of transforming design drawings and the like (DD) used in engineering the process control system into a semantic model (M) expressed by first information indicating elements included in the design drawings and the like and second information indicating a relationship between the elements and a combined semantic model generation step (S12) of generating a combined semantic model (CM) that combines a plurality of semantic models based on a degree of similarity between a plurality of semantic models.

Furthermore, the engineering support method of one or more further has a semantic model information extraction step (S13) of extracting an extracted semantic model according to an instruction from the combined semantic model and a second transformation step (S14) of transforming the extracted semantic model extracted at the semantic model information extraction step into the design drawings and the like.

An engineering support system that supports engineering of a process control system according to one or more embodiments includes a storage and a processor connected to the storage. The processor transforms design drawings into a plurality of semantic models and outputs the plurality of semantic models to the storage and generates a combined semantic model that combines the plurality of semantic models based on a degree of similarity among the plurality of semantic models and outputs the combined semantic model to the storage. Each of the plurality of semantic models is expressed by first information indicating elements included in the design drawings and second information indicating a relationship between the elements.

One or more embodiments significantly improve working efficiency by associating and integrating various information used in engineering.

DETAILED DESCRIPTION

Figure 1:
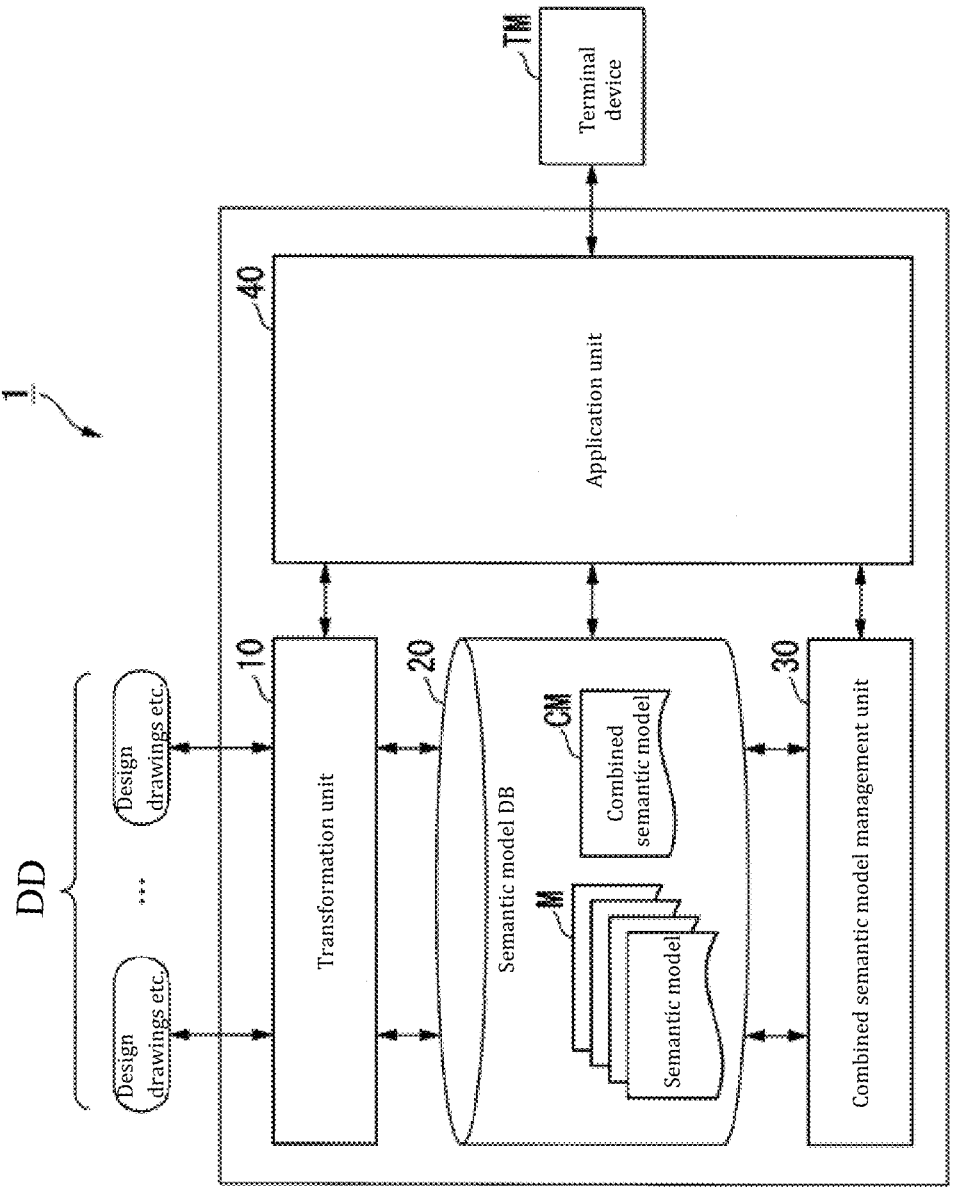
FIG. 1 shows a block diagram illustrating a principal configuration of an engineering support system according to one or more embodiments.

An engineering support system and an engineering support method of one or more embodiments are described in detail below with reference to the drawings. Hereinbelow, first, an overview of one or more embodiments is described. Next, details of one or more embodiments are described.

One or more embodiments may enable significantly improving working efficiency by automatically performing at least a portion of associating and integrating various information used in engineering. Here, as above, there is a large variety of design drawings and the like used in the engineering, beginning with a P&ID and a PFD. Moreover, in engineering a process control system, a perspective and an approach when working of an engineer differ according to each component such that necessary design drawings and the like also differ.

For example, an engineer engineering a human-machine interface (HMI: Human Machine Interface), a control device, a network, or the like works from a perspective of logical connections (connections between functions) and as such requires design drawings and the like illustrating logical connections. In contrast, an engineer performing instrumentation maintenance or facility maintenance works from a perspective of physical connections (connections between devices) and as such requires design drawings and the like illustrating physical connections.

In this manner, because there is a large variety of design drawings and the like and necessary design drawings and the like may differ according to each engineer involved in the engineering, it is hard to say that simply centrally managing the design drawings and the like amounts to sharing the design drawings and the like in a usable form among the engineers involved in the engineering. This is because even if design drawings and the like required by one engineer are updated, design drawings and the like required by another engineer are not necessarily updated as well. In these conditions, it is often the case that an effect that a change in a portion of the components has on other components cannot be grasped directly.

Furthermore, an operation period of a plant is long—for example, thirty years or longer. During this period, it is anticipated that setting changes, additions, and the like will arise for the process control system due to modification or expansion of plant facilities. At that time, it is also possible for engineering tools per se used to engineer the setting changes, additions, and the like of the process control system to be changed. For example, an engineering tool may be improved in function or changed to another engineering tool. In such a situation, sharing information of the engineering tool from before the change becomes difficult after the change.

Furthermore, according to characteristics of the engineering tools used in the engineering, the knowledge and experience of the engineers performing the engineering, and the like, idiosyncrasies, individual characteristics, and the like arise in the design drawings and the like that are created. As such, it is difficult for an engineer to accurately understand design drawings and the like whose creation and the like they were not involved in and design drawings and the like created using an engineering tool they have no experience using. As a result, difficulties arise when, for example, an engineer other than the engineer who created the design drawings and the like attempts to utilize the existing design drawings and the like.

In one or more embodiments, the design drawings and the like used in engineering the process control system are transformed into a semantic model expressed by first information, indicating elements included in the design drawings and the like, and second information, indicating relationships between the elements. Moreover, based on a degree of similarity between a plurality of semantic models, a combined semantic model combining the plurality of semantic models is generated. In this manner, working efficiency can be significantly improved by associating and integrating various information (design drawings and the like) used in the engineering.

<Principal Configuration of Engineering Support System>

FIG. 1 is a block diagram illustrating a principal configuration of an engineering support system of one or more embodiments. As illustrated in FIG. 1, an engineering support system 1 of the present embodiments is provided with a transformation unit 10, a semantic model database (DB) 20 (storage unit or storage), a combined semantic model management unit 30, and an application unit (application) 40. An engineering support system 1 of such a configuration supports engineering of a process control system (not illustrated) by managing design drawings and the like DD used in engineering the process control system (not illustrated). Note that here, managing the design drawings and the like DD signifies managing a plurality of design drawings and the like DD as the above combined semantic model as well as extracting necessary information from the combined semantic model to create new design drawings and the like DD.

The engineering support system 1 manages the design drawings and the like DD according to instructions from a terminal device TM. The terminal device TM is a device that is connected wirelessly non-wirelessly to the engineering support system 1 and operated by a user. This terminal device TM is provided with input devices such as a keyboard and a pointing device and a display device such as a liquid-crystal display device. The terminal device TM sends instructions input by the user operating an input device to the engineering support system 1. Moreover, the terminal device TM displays various information sent from the engineering support system 1 on the display device.

Here, the design drawings and the like DD managed by the engineering support system 1 are any design drawings, specifications, and the like used in the engineering. For example, a P&ID, a PFD, a device list, device setting information, a control logic diagram, a simulation model, a graphic drawing, and a CAD drawing or the like (including a 3D drawing) can be mentioned. Note that the design drawings and the like DD may also be data or, as long as data reading is possible, printed on a paper medium. Moreover, the engineering support system 1 manages any number and any type of design drawings and the like DD.

The transformation unit 10 transforms the design drawings and the like DD used in engineering the process control system into a semantic model M expressed by information indicating elements included in the design drawings and the like DD (first information) and information indicating relationships between the elements (second information). For example, when a plurality of devices provided in a plant is included as elements of design drawings and the like DD, the transformation unit 10 generates a semantic model M expressed by information indicating these devices and information indicating connection relationships of these devices.

The above information indicating the devices includes information indicating device names and information indicating device properties. For example, the properties can include, in addition to features and properties unique to a device (for example, a capacity of a tank or the like, a diameter of piping, a device maker, or handling method), setting values, parameters, and the like set for each device according to a system configuration or simulation conditions. Note that the semantic model M may be generated using so-called ontology technology. Moreover, the transformation unit 10 can also transform an extracted semantic model EM (see FIG. 3) into design drawings and the like DD.

Figure 2:
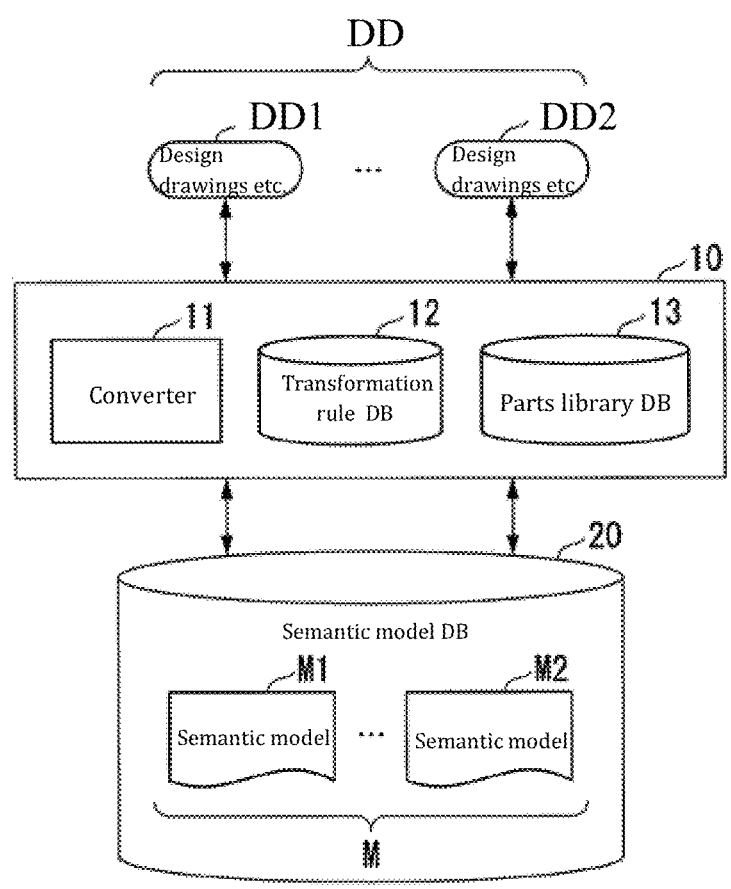
FIG. 2 shows a block diagram illustrating a principal configuration of a transformation unit provided by the engineering support system according to one or more embodiments.

FIG. 2 is a block diagram illustrating a principal configuration of the transformation unit provided by the engineering support system of one or more embodiments. As illustrated in FIG. 2, the transformation unit 10 is provided with a converter 11, a transformation rule database 12 (second database), and a parts library database 13.

The converter 11 transforms the design drawings and the like DD into the semantic model M according to transformation rules stored in the transformation rule database 12. For example, the converter 11 transforms design drawings and the like DD1 into a semantic model M1 and transforms design drawings and the like DD2 into a semantic model M2. Moreover, the converter 11 transforms an extracted semantic model EM (see FIG. 3) into design drawings and the like DD according to the transformation rules stored in the transformation rule database 12.

The transformation rule database 12 stores rules for transformation between the design drawings and the like DD and the semantic model M (extracted semantic model EM) (transformation rules). This transformation rule database 12 stores, for example, the above transformation rules according to type of design drawings and the like DD. This transformation rule database 12 may store correction rules for correcting a difference in transformation method according to a difference in engineering tool or vendor used to create and change the design drawings and the like DD. Note that depending on the type of design drawings and the like DD, transformation rules for generating a semantic model M in a format conforming to standardized specifications such as IEC 61360-2 (list of devices used) and IEC 62832 (device setting information) may be included.

The parts library database 13 stores unique parts necessary for transformation when the converter 11 transforms an extracted semantic model EM (see FIG. 3) into design drawings and the like DD. Here, because the semantic model M is, as it were, an abstraction imparted with meaning of the design drawings and the like DD, when creating specific design drawings and the like DD from the abstracted semantic model M, specific information (parts) needs to be supplemented. The parts library database 13 stores such specific unique parts. For example, the parts library database 13 stores display parts relating to a graphic definition (for example, icons schematically illustrating a tank and a valve). Note that even with the same design drawings and the like DD, parts used may differ according to engineering tool used. As such, a plurality of parts may be prepared for each engineering tool.

The semantic model database 20 stores, for reuse or as history, semantic models M transformed by the transformation unit 10 and a combined semantic model CM (details described below) obtained by combining semantic models M. Note that the semantic model database 20 may store an extracted semantic model EM (see FIG. 3).

The combined semantic model management unit 30 manages the combined semantic model CM stored in the semantic model database 20. Specifically, the combined semantic model management unit 30 generates the combined semantic model CM by combining a plurality of semantic models M transformed by the transformation unit 10. Here, the combined semantic model management unit 30 generates the combined semantic model CM based on a degree of similarity between a plurality of semantic models M. Moreover, the combined semantic model management unit 30 extracts an extracted semantic model EM according to instructions from the terminal device TM from the combined semantic model CM.

Figure 3:
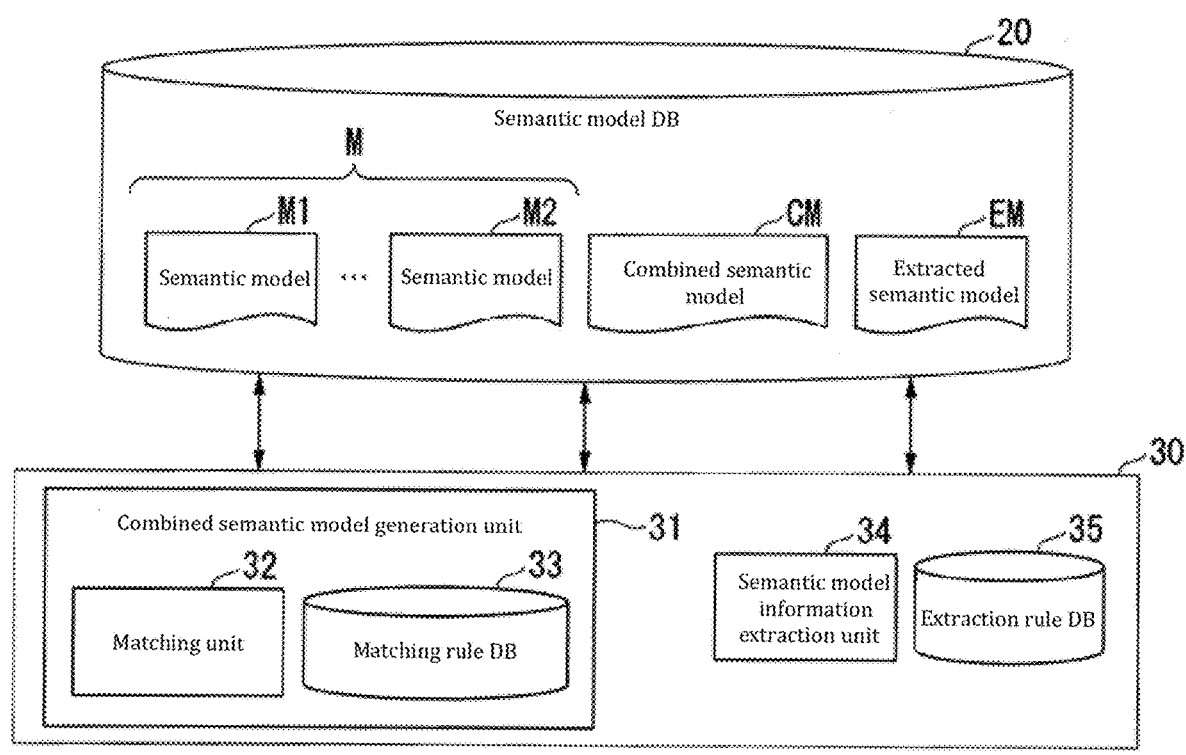
FIG. 3 shows a block diagram illustrating a principal configuration of a combined semantic model management unit provided by the engineering support system according to one or more embodiments.

FIG. 3 is a block diagram illustrating a principal configuration of the combined semantic model management unit provided by the engineering support system of one or more embodiments. As illustrated in FIG. 3, the combined semantic model management unit 30 is provided with a combined semantic model generation unit 31, a semantic model information extraction unit 34, and an extraction rule database 35 (third database).

The combined semantic model generation unit 31 generates the combined semantic model CM by combining a plurality of semantic models M. Specifically, the combined semantic model generation unit 31 is provided with a matching unit 32 (similarity calculation unit) and a matching rule database 33 (first database) and generates the combined semantic model CM by combing a plurality of semantic models M based on a degree of similarity calculated by the matching unit 32. Note that as with a calculation example of the degree of similarity between the plurality of semantic models M, a generation example of the combined semantic model CM is described below.

The matching unit 32 calculates the degree of similarity between the plurality of semantic models M. Specifically, the matching unit 32 calculates the above similarity according to matching rules stored in the matching rule database 33. The matching rule database 33 stores matching rules (calculation rules) necessary to calculate the above similarity.

Here, as above, the semantic model M is expressed by the information indicating the elements included in the design drawings and the like DD (first information) and the information indicating the relationships between the elements (second information). As such, the matching rules include rules for calculating a degree of similarity between the first information included in the plurality of semantic models M and rules for calculating a degree of similarity between the second information included therein. Accordingly, the degree of similarity calculated by the matching unit 32 indicates the degree of similarity between the first information included in the plurality of semantic models M and the degree of similarity between the second information included therein. Note that the calculation example of the degree of similarity between the plurality of semantic models M is described below.

The semantic model information extraction unit 34 extracts an extracted semantic model EM according to instructions from the terminal device TM from the combined semantic model CM according to the extraction rules stored in the extraction rule database 35. Here, instructions necessary for the semantic model information extraction unit 34 to extract the extracted semantic model EM are an instruction specifying the type of the design drawings and the like DD to be created (type of semantic model to extract) and an instruction specifying a range of the design drawings and the like DD to be created. As such, the semantic model information extraction unit 34 extracts an extracted semantic model EM necessary to create the design drawings and the like DD of the instructed type in the instructed range from the combined semantic model CM. Note that as the instructions necessary to extract the extracted semantic model EM, a condition may be necessary in addition to the type of design drawings and the like DD to be created. An extraction example of the extracted semantic model EM is described below.

The extraction rule database 35 stores the extraction rules for extracting the extracted semantic model EM from the combined semantic model CM. The extraction rules stored in the extraction rule database 35 define what manner of information needs to be extracted from the combined semantic model CM to create the design drawings and the like DD. The extraction rule database 35 stores the extraction rules according to type of design drawings and the like DD.

The application unit 40 provides functions useful for the engineering support system 1 to manage the design drawings and the like DD based on instructions from the terminal device TM. For example, the application unit 40 provides a function of correcting the semantic model M, the combined semantic model CM, and the extracted semantic model EM and a function of supporting correction of the semantic model M, the combined semantic model CM, and the extracted semantic model EM. Moreover, the application unit 40 provides a function of comparing a plurality of semantic models M, a function of comparing a plurality of combined semantic models CM, and a function of comparing a plurality of extracted semantic models EM.

Figure 4:
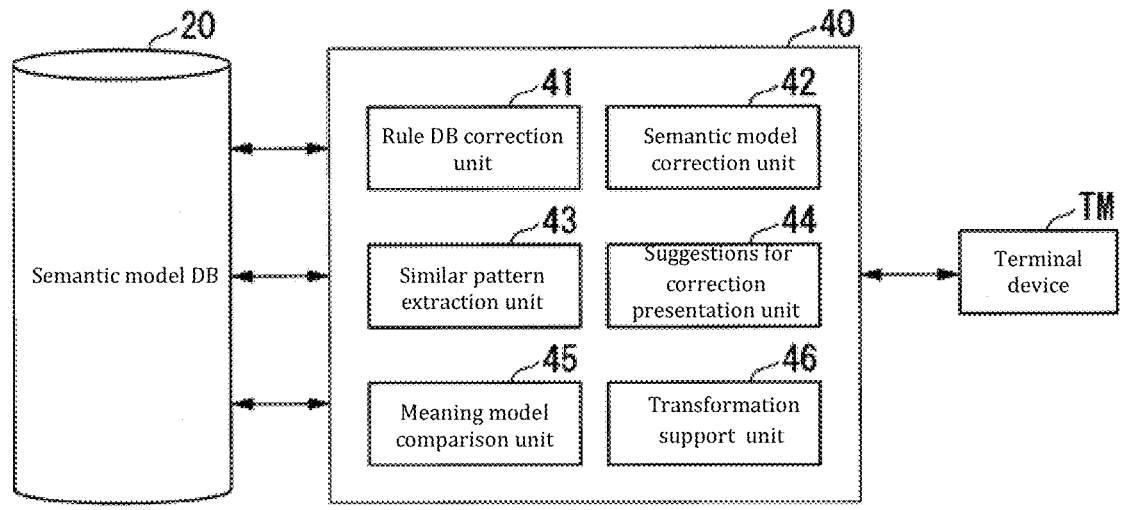
FIG. 4 shows a block diagram illustrating a principal configuration of an application unit provided by the engineering support system according to one or more embodiments.

FIG. 4 is a block diagram illustrating a principal configuration of the application unit provided by the engineering support system of one or more embodiments. As illustrated in FIG. 4, the application unit 40 is provided with a rule database correction unit 41, a semantic model correction unit 42, a similar pattern extraction unit 43, a suggestions for correction presentation unit 44, a semantic model comparison unit 45, and a transformation support unit 46.

The rule database correction unit 41 corrects the transformation rule database 12 provided in the transformation unit 10, the matching rule database 33 provided in the combined semantic model management unit 30, and the extraction rule database 35 provided in the combined semantic model management unit 30 based on instructions from the terminal device TM. The semantic model correction unit 42 corrects the semantic model M and the extracted semantic model EM stored in the semantic model database 20 based on instructions from the terminal device TM. Note that correction by the rule database correction unit 41 and the semantic model correction unit 42 is performed when, for example, the degree of similarity between the plurality of semantic models M is calculated by the matching unit 32 illustrated in FIG. 3 or when the extracted semantic model EM is extracted by the semantic model information extraction unit 34.

The similar pattern extraction unit 43 searches the semantic model database 20 and extracts a pattern similar to design drawings and the like DD or a semantic model M instructed from the terminal device TM, including a vicinity thereof. For example, if there is a semantic model M needing correction, the similar pattern extraction unit 43 searches from the semantic model database 20 a pattern similar to this semantic model M. Note that a similar pattern is a portion (pattern) wherein elements (nodes) included in this semantic model M and the vicinity thereof and relationships between elements (nodes) are similar.

When a location needing correction is present in a transformed semantic model M, a combined semantic model CM, or the like ("semantic model M or the like"), the suggestions for correction presentation unit 44 extracts and presents, automatically or as instructed by an engineer, this semantic model M or the like needing correction or the location therein requiring correction. Moreover, to assist correction of the semantic model M or the like by an engineer, the suggestions for correction presentation unit 44 may extract, by the similar pattern extraction unit 43, a pattern similar to the presented semantic model M or the like or a presentation location therein (location needing correction) from models stored in the system and present (display) this as reference.

At this time, the suggestions for correction presentation unit 44 may present patterns with higher similarity to the semantic model M or the like to be corrected (patterns with greater similarity) and present these ordered according to similarity. The suggestions for correction presented by the suggestions for correction presentation unit 44 and the similar pattern to serve as reference in correcting such are displayed on the terminal device TM. By being presented with a correction target and a similar reference semantic model as a comparison target, an engineer can more easily correct a part needing correction.

The semantic model comparison unit 45 compares a plurality of combined semantic models CM and extracts a difference based on instructions from the terminal device TM. An extraction result of the semantic model comparison unit 45 is sent to the terminal device TM. The semantic model comparison unit 45 may compare a newest semantic model M and a past semantic model M.

The transformation support unit 46 supports a transformation process when the transformation unit 10 performs transformation (including both transformation from design drawings and the like DD to a semantic model M and transformation from an extracted semantic model EM to design drawings and the like DD). For example, when the transformation unit 10 performs conversion, the transformation support unit 46 performs detection of excess or insufficient elements, new elements, or the like and detection of a transformation error or the like and outputs detection results thereof to the terminal device TM.

When the semantic model M needs to be corrected, the user corrects the semantic model M via the terminal device TM. When this becomes a new rule (when a current rule is to be corrected), the rule database correction unit 41 causes this corrected rule to be reflected in the transformation rule database 12. By such repair being performed, the detected new element, excess or insufficient element, transformation error, or the like is resolved. Note that when the transformation rule database 12 is corrected by the user, the corrected (new) rule may be automatically applied to a target semantic model M. In this situation, if any one among the semantic model M and the transformation rule database 12 is corrected, this correction is automatically reflected in the other among these.

<Basic Operation Example of Engineering Support System>

Figure 5:
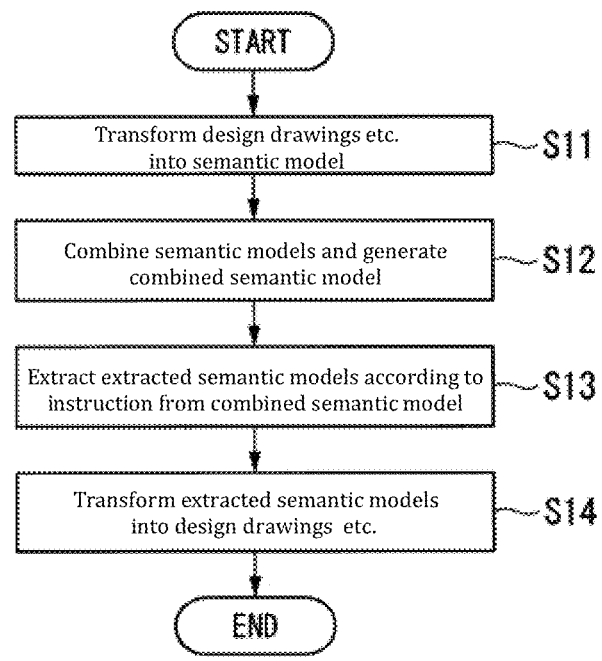
FIG. 5 shows a flowchart illustrating a basic operation example of the engineering support system according to one or more embodiments.
Figure 6:
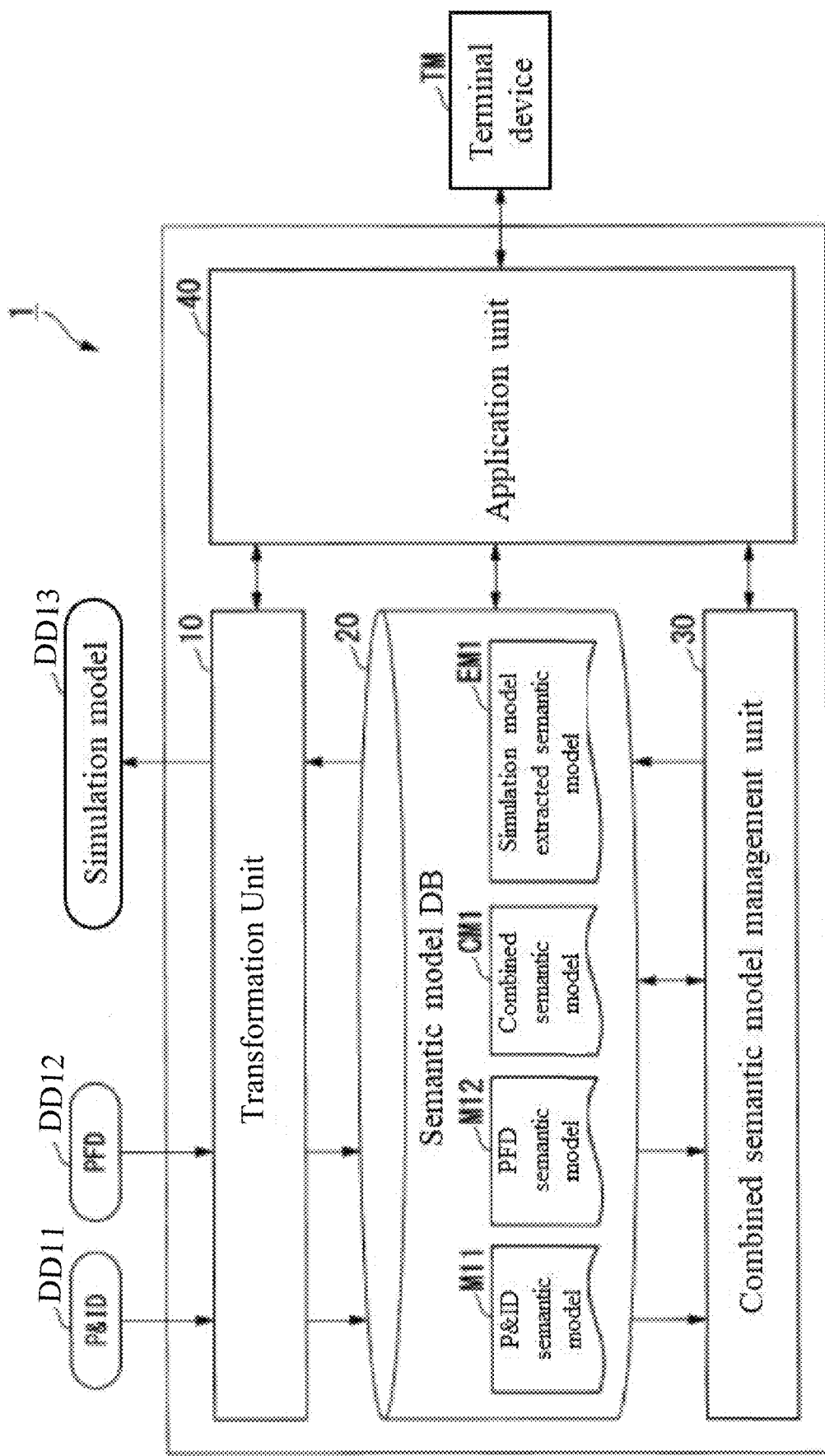
FIG. 6 shows a diagram for describing the basic operation example according to one or more embodiments.

FIG. 5 is a flowchart illustrating a basic operation example of the engineering support system of one or more embodiments. Note that the flowchart illustrated in FIG. 5 starts by, for example, the engineering support system 1 receiving an instruction to start processing sent from the terminal device TM. Note that as illustrated in FIG. 6, described below is an example of creating a simulation model (design drawings and the like DD13) from a P&ID (design drawings and the like DD11) and a PFD (design drawings and the like DD12). FIG. 6 is a diagram for describing the basic operation example in one or more embodiments.

When the flowchart illustrated in FIG. 5 starts, first, the transformation unit 10 performs a process of transforming the design drawings and the like into a semantic model (step S11: first transformation step). Specifically, the design drawings and the like are transformed into a semantic model according to the transformation rules stored in the transformation rule database 12 of the transformation unit 10, and the converter 11 provided in the transformation unit 10 performs a process of storing the transformed semantic model in the semantic model database 20.

More specifically, the P&ID (design drawings and the like DD11) is read into the converter 11 and transformation rules for transforming a P&ID into a semantic model are read into the converter 11 from the transformation rule database 12. Then, according to the read transformation rules, the converter 11 performs a process of transforming the P&ID (design drawings and the like DD11) into a P&ID semantic model M11. Similarly, the PFD (design drawings and the like DD12) is read into the converter 11 and transformation rules for transforming a PFD into a semantic model are read into the converter 11 from the transformation rule database 12. Then, according to the read transformation rules, the converter 11 performs a process of transforming the PFD (design drawings and the like DD12) into a PFD semantic model M12.

Figure 7A:
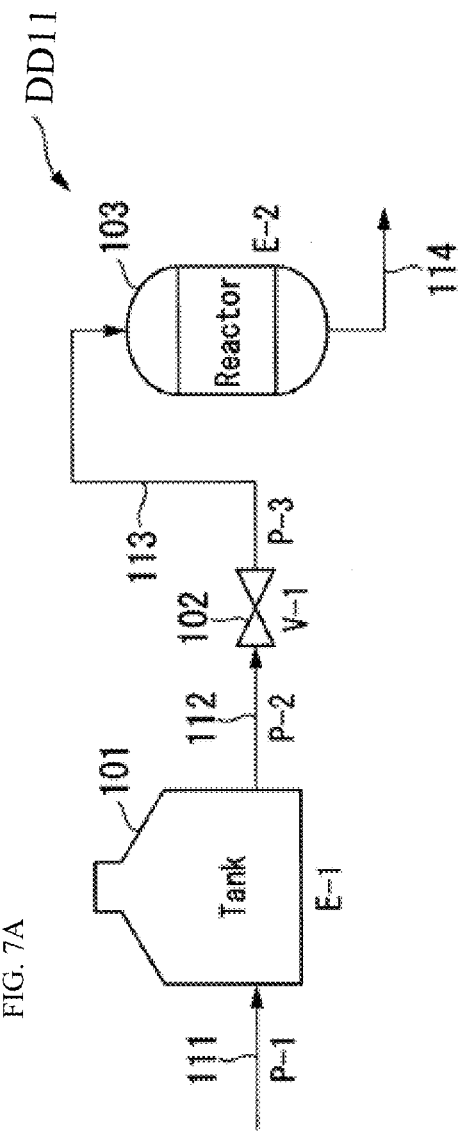
FIGS. 7A and 7B show a diagram for describing a P&ID that is design drawings and the like managed according to one or more embodiments and a semantic model thereof.

FIG. 7 is a diagram for describing a P&ID that is design drawings and the like managed by one or more embodiments and a semantic model thereof. The P&ID that is the design drawings and the like DD11 illustrated in FIG. 7A is a diagram of a tank 101, a valve 102, and a reactor 103 connected by piping 111 to 114. Specifically, the piping 111 is connected to an upstream side of the tank 101, the piping 112 is connected between the tank 101 and the valve 102, the piping 113 is connected between the valve 102 and the reactor 103, and the piping 114 is connected to a downstream side of the reactor 103. Note that the tank 101, the valve 102, and the reactor 103 are indicated by reference signs that enable intuitive and ready comprehension.

Furthermore, the P&ID illustrated in FIG. 7A includes names of the tank 101, the valve 102, the reactor 103, and the piping 111 to 114. Specifically, the name of the tank 101 is "E-1," the name of the valve 102 is "V-1," and the name of the reactor 103 is "E-2." The names of the piping 111 to 114 are "P-1" to "P-4." Note that although not illustrated in FIG. 7A, the P&ID includes information indicating properties of elements included in the P&ID (including devices, apparatuses, facilities, and the like provided in the plant).

Figure 7B:
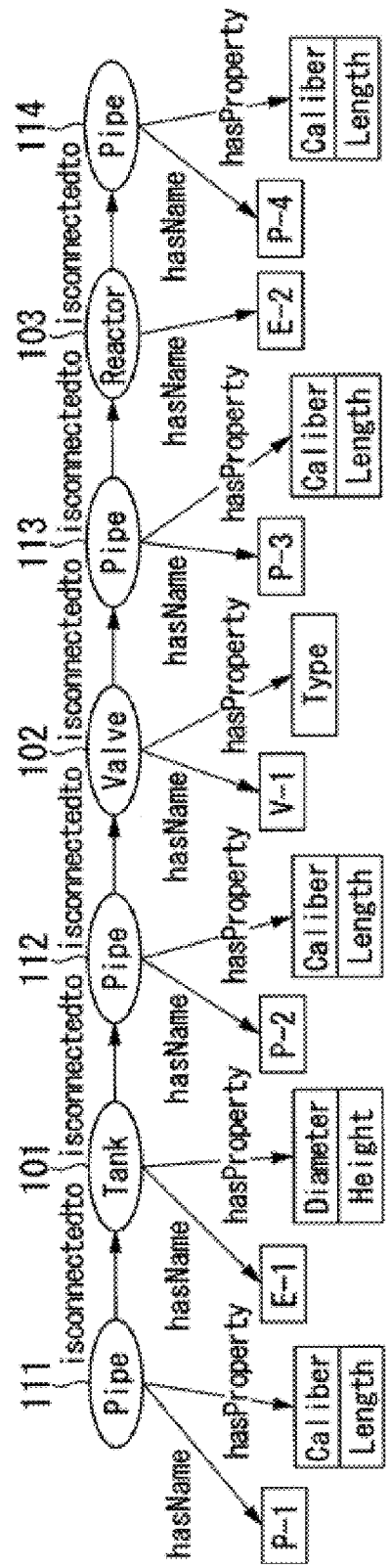

The P&ID semantic model M11 illustrated in FIG. 7B is generated from the P&ID illustrated in FIG. 7A. As illustrated in FIG. 7B, in the P&ID semantic model M11, the tank 101, the valve 102, and the reactor 103 and the piping 111 to 114 are abstracted and expressed as nodes. Each node is tied to information indicating a name and information indicating properties as information indicating this node (first information). Moreover, each node is tied to information indicating connection relationships between the tank 101, the valve 102, and the reactor 103 and the piping 111 to 114 (second information).

For example, the node illustrating the tank 101 is tied to "E-1" as information indicating a name (hasName) and "Diameter" and "Height" as information indicating properties (hasProperty). The node illustrating the tank 101 is tied to information indicating the node of the piping 112 as information indicating a connection destination (isconnectedto). Moreover, the node illustrating the piping 112 is tied to "P-2" as information indicating a name (hasName) and "Caliber" and "Length" as information indicating properties (hasProperty). The node illustrating the piping 112 is tied to information indicating the node of the valve 102 as information indicating a connection destination (isconnectedto).

Moreover, the node illustrating the piping 113 is tied to "P-3" as information indicating a name (hasName) and "Caliber" and "Length" as information indicating properties (hasProperty). The node illustrating the piping 113 is tied to information indicating the node of the reactor 103 as information indicating a connection destination (isconnectedto). Moreover, the node illustrating the reactor 103 is tied to "E-2" as information indicating a name (hasName) but is not tied to information indicating properties (hasProperty). This is because the P&ID illustrated in FIG. 7A includes information indicating the name of the reactor 103 but does not include information indicating properties of the reactor 103. The node illustrating the reactor 103 is tied to information indicating the node of the piping 114 as information indicating a destination connection (isconnectedto).

Figure 8A:
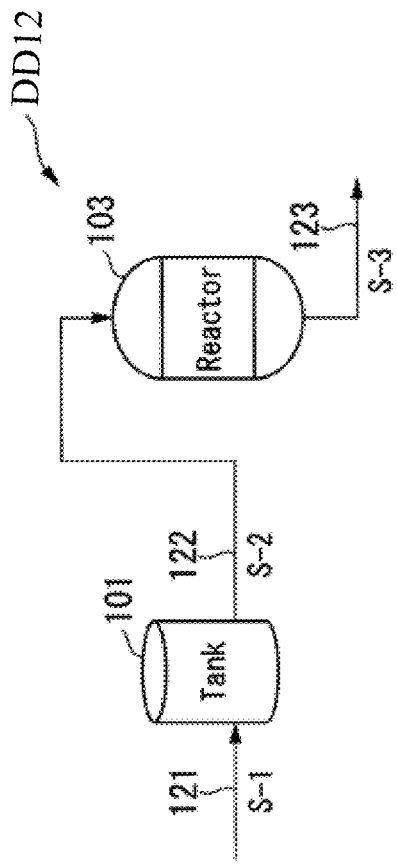
FIGS. 8A and 8B show a diagram for describing a PFD that is design drawings and the like managed according to one or more embodiments and a semantic model thereof.
Figure 8B:
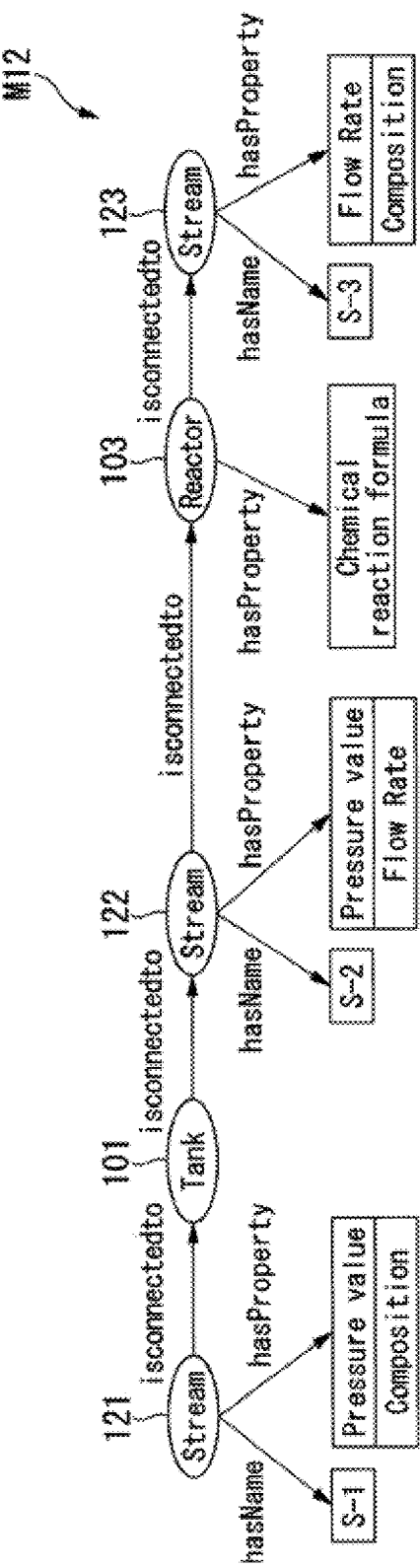

FIGS. 8A and 8B are diagrams for describing a PFD that is design drawings and the like managed by one or more embodiments and a semantic model thereof. The PFD that is the design drawings and the like DD12 illustrated in FIG. 8A is a diagram illustrating the tank 101 and the reactor 103 and flows 121 to 123 illustrating a flow of a raw material. Specifically, the flow 121 is illustrated on the upstream side of the tank 101, the flow 122 is illustrated between the tank 101 and the reactor 103, and the flow 123 is illustrated on the downstream side of the reactor 103. Note that in the PFD, similarly to the P&ID, the tank 101 and the reactor 103 are indicated by reference signs that enable intuitive and ready comprehension. Moreover, in the PFD, because the flow is important, the valve 102 and the piping 111 to 114 illustrated in FIG. 7A are omitted.

Furthermore, the PFD illustrated in FIG. 8A includes names of the flows 121 to 123. Specifically, the name of the flow 121 is "S-1," the name of the flow 122 is "S-2," and the name of the flow 123 is "S-3." Note that although not illustrated in FIG. 8A, the PFD also includes the names of the tank 101 and the reactor 103. Moreover, the PFD includes information indicating properties of elements included in the PFD (including flows and the like in addition to devices, apparatuses, facilities, and the like provided in the plant).

The PFD semantic model M12 illustrated in FIG. 8B is generated from the PFD illustrated in FIG. 8A. As illustrated in FIG. 8B, in the PFD semantic model M12, the tank 101 and the reactor 103 and the flows (streams) 121 to 123 are abstracted and expressed as nodes. Each node is tied to information indicating a name and information indicating properties as information indicating this node (first information). Moreover, each node is tied to information indicating relationships between the tank 101 and the reactor 103 and the flows 121 to 123 (second information).

For example, the node illustrating the tank 101 is not tied to information indicating a name (hasName) and information indicating properties (hasProperty). The node illustrating the tank 101 is tied to information indicating the node of the flow 122 as information indicating a connection destination (isconnectedto). Moreover, the node illustrating the flow 122 is tied to "S-2" as information indicating a name (hasName) and "Pressure value" and "Flow Rate" as information indicating properties (hasProperty). The node illustrating the flow 122 is tied to information indicating the node of the reactor 103 as information indicating a connection destination (isconnectedto).

Furthermore, the node illustrating the reactor 103 is not tied to information indicating a name (hasName) and is tied to "Chemical reaction formula" as information indicating properties (hasProperty). The node illustrating the reactor 103 is tied to information indicating the node of the flow 123 as information indicating a connection destination (isconnectedto).

In this manner, both the P&ID semantic model M11 obtained by transforming the P&ID (design drawings and the like DD11) and the PFD semantic model M12 obtained by transforming the PFD (design drawings and the like DD12) are expressed as nodes by abstracting the elements included in the design drawings and the like DD11, DD12. Moreover, each node is tied to information indicating that node (first information) and information indicating relationships between the nodes (second information). Note that this information may be omitted when not included in the P&ID and the PFD. In this manner, despite being design drawings and the like of different types, the semantic models generated by transformation by the transformation unit 10 are expressed by information indicating the elements included in the design drawings and the like (first information) and information indicating the relationships between the elements (second information).

Note that in FIG. 7B and FIG. 8B, to facilitate understanding, the P&ID semantic model M11 and the PFD semantic model M12 are expressed as diagrams wherein the nodes and the various information are connected by lines (arrows). However, the P&ID semantic model M11 and the PFD semantic model M12 may be expressed by a markup language such as HTML (Hypertext Markup Language) or XML (eXtensible Markup Language).

Furthermore, when the process of step S11 illustrated in FIG. 5 is performed, as necessary, an engineer may verify the generated semantic model and, according to verification results, correct a content of the transformation rule database 12 provided in the transformation unit 10. For example, as necessary, an engineer can verify the generated semantic model using a function of the transformation support unit 46 provided in the application unit 40 and correct the content of the transformation rule database 12 using a function of the rule database correction unit 41.

Next, the combined semantic model management unit 30 performs a process of combining semantic models to generate a combined semantic model (step S12: combined semantic model generation step). Specifically, the matching unit 32 performs a process of calculating a degree of similarity between a plurality of semantic models according to the matching rules stored in the matching rule database 33 of the combined semantic model management unit 30. Then, based on the degree of similarity calculated by the matching unit 32, the combined semantic model generation unit 31 performs a process of generating a combined semantic model by combining a plurality of semantic models.

More specifically, the P&ID semantic model M11 and the PFD semantic model M12 are read into the matching unit 32 and matching rules necessary to calculate the degree of similarity between these semantic models are read into the matching unit 32 from the matching rule database 33. Then, according to the read matching rules, the matching unit 32 performs a process of calculating a degree of similarity between the P&ID semantic model M11 and the PFD semantic model M12. Afterward, the P&ID semantic model M11 and the PFD semantic model M12 are read into the combined semantic model generation unit 31 and the degree of similarity calculated by the matching unit 32 is read into the combined semantic model generation unit 31. Then, based on the read similarity, the combined semantic model generation unit 31 performs a process of combining the P&ID semantic model M11 and the PFD semantic model M12 to generate a combined semantic model CM1.

Figure 9:
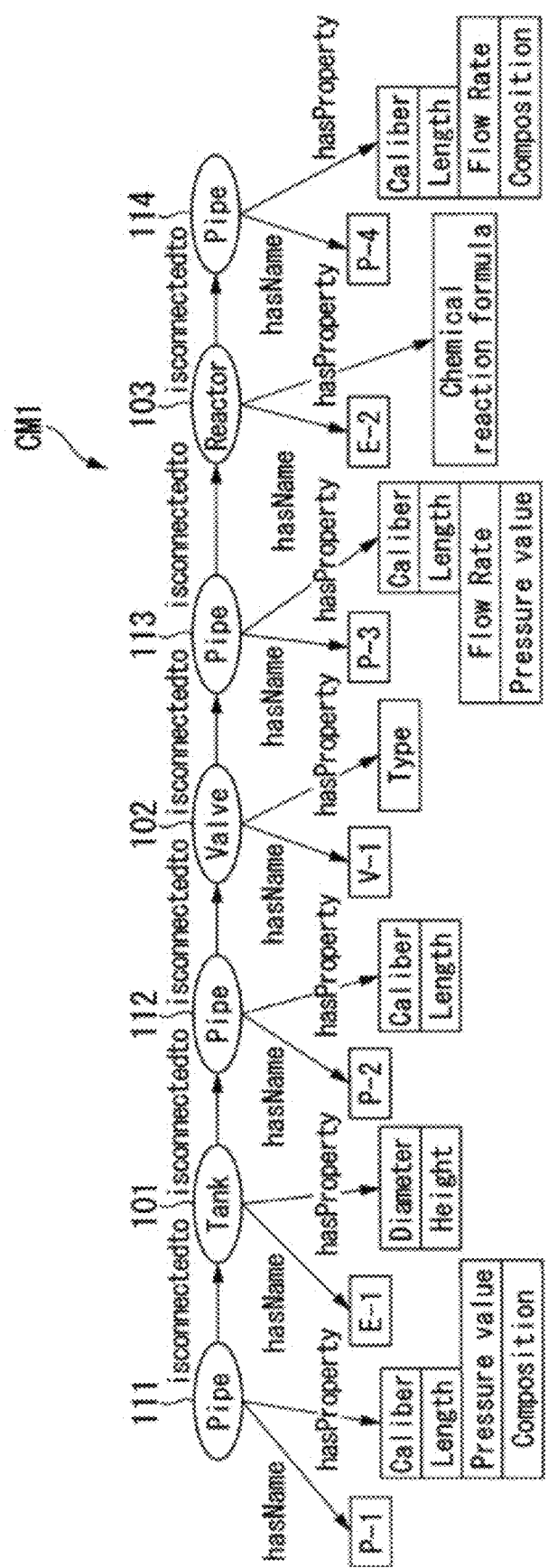
FIG. 9 shows a diagram for describing a combined semantic model generated according to one or more embodiments.

FIG. 9 is a diagram for describing the combined semantic model generated in one or more embodiments. The combined semantic model CM1 illustrated in FIG. 9 is generated from the P&ID semantic model M11 illustrated in FIG. 7B and the PFD semantic model M12 illustrated in FIG. 8B. Referring to FIG. 9, in the combined semantic model CM1, the tank 101, the valve 102, and the reactor 103 and the piping 111 to 114 are expressed similarly to the P&ID semantic model M11 illustrated in FIG. 7B.

Here, in the P&ID semantic model M11 illustrated in FIG. 7B and the PFD semantic model M12 illustrated in FIG. 8B, the node of the tank 101 and the node of the reactor 103 are in common. As such, the node of the tank 101 included in the P&ID semantic model M11 and the node of the tank 101 included in the PFD semantic model M12 have a high degree of similarity. Similarly, the node of the reactor 103 included in the P&ID semantic model M11 and the node of the reactor 103 included in the PFD semantic model M12 have a high degree of similarity.

Furthermore, in the P&ID semantic model M11 illustrated in FIG. 7B, by supposing that the node of the piping 112, the node of the valve 102, and the node of the piping 113 are one node, an arrangement of the nodes in the P&ID semantic model M11 becomes identical to an arrangement of the nodes in the PFD semantic model M12. As such, there is a high degree of similarity between the arrangement of the nodes included in the P&ID semantic model M11 and the arrangement of the nodes included in the PFD semantic model M12.

By the P&ID semantic model M11 and the PFD semantic model M12 being combined by the combined semantic model generation unit 31 based on the above degree of similarity, the combined semantic model CM1 illustrated in FIG. 9 is generated. For example, if a degree of similarity between the node of the tank 101 in the P&ID semantic model M11 and the node of the tank 101 in the PFD semantic model M 12 is at or above a certain extent, the combined semantic model generation unit 31 determines these nodes of the tank 101 to be identical. The combined semantic model generation unit 31 makes a similar determination for the nodes of the reactors 103 in the P&ID semantic model M11 and the PFD semantic model M12.

Meanwhile, the node of the valve 102 appearing between the node of the tank 101 and the node of the reactor 103 in the P&ID semantic model M11 is not present in the PFD semantic model M12. However, from being present between two nodes determined to be identical (the node of the tank 101 and the node of the reactor 103) and an overall relationship and degree of matching (of nodes in a vicinity), a position of the node of the valve 102 is specified to be between the node of the tank 101 and the node of the reactor 103. Note that the combined semantic model CM1 illustrated in FIG. 9 is generated by the combined semantic model generation unit 31 performing the processes given below on the P&ID semantic model M11 and the PFD semantic model M12:

Process of integrating the node of the tank 101 in the P&ID semantic model M11 and the node of the tank 101 in the PFD semantic model M12

Process of integrating the node of the reactor 103 in the P&ID semantic model M11 and the node of the reactor 103 in the PFD semantic model M12

Process of integrating the node of the piping 111 in the P&ID semantic model M11 and the node of the flow 121 in the PFD semantic model M12

Process of integrating the node of the piping 113 in the P&ID semantic model M11 and the node of the flow 122 in the PFD semantic model M12

Process of integrating the node of the piping 114 in the P&ID semantic model M11 and the node of the flow 123 in the PFD semantic model M12

The combined semantic model CM1 illustrated in FIG. 9 is, as it were, the PFD semantic model M12, which has a relatively smaller number of elements, being integrated into the P&ID semantic model M11, which has a relatively greater number of elements. As such, in the combined semantic model CM1 illustrated in FIG. 9, the nodes of the flows 121, 122, 123 in the PFD semantic model M12 are respectively integrated into the nodes of the piping 111, 113, 114 in the P&ID semantic model M11. As such, the nodes of the flows 121, 122, 123 in the PFD semantic model M12 do not appear in the combined semantic model CM1.

Note that in the above integration, the combined semantic model CM1 may have information had by each of the combined semantic models. For example, the combined semantic model CM1 may have both information on "piping" in the P&ID and information on "flow" in the PFD.

When integrating nodes included in a plurality of semantic models, as above, integration may be by a method of integrating a node included in one semantic model into a node included in another semantic model or by another method. For example, among nodes included in a plurality of semantic models, nodes having similar meanings may be integrated by a method of integrating these into a new node having a meaning that includes these meanings. For example, the node of the piping 111 included in the P&ID semantic model M11 and the node of the flow 121 included in the PFD semantic model M12 may be integrated into a new node having a meaning of "tank input."

Note that in FIG. 9, similarly to FIG. 7B and FIG. 8B, to facilitate understanding, the combined semantic model CM1 is expressed as a diagram wherein nodes and various information are connected by lines (arrows). However, the combined semantic model CM1 may be expressed by a markup language such as HTML or XML.

Furthermore, when the process of step S12 illustrated in FIG. 5 is performed, as necessary, an engineer may verify the generated combined semantic model CM1 and, according to verification results, correct a content of the matching rule database 33 provided in the combined semantic model management unit 30. For example, a function of the rule database correction unit 41 provided in the application unit 40 can be used to correct the content of the matching rule database 33.

The combined semantic model CM1 may be generated in unit units of facilities provided in the plant, area units of a partial region of the plant, or plant units of an entirety of the plant. Generating the combined semantic model CM1 in such units enables imparting meaning to and aggregating information (design drawings and the like) needed by a plurality of engineers involved in engineering.

Next, the semantic model information extraction unit 34 performs a process of extracting a semantic model according to instructions from the combined semantic model (step S13: semantic model information extraction step). Specifically, the semantic model information extraction unit 34 performs a process of extracting an extracted semantic model EM according to instructions from the terminal device TM from the combined semantic model CM1 according to the extraction rules stored in an extraction rule database 35 of the combined semantic model management unit 30.

More specifically, an instruction specifying a simulation model to be created (design drawings and the like DD13) and an instruction specifying a range of the simulation model to be created (design drawings and the like DD13) (for example, an instruction to use certain units as the range) are sent from the terminal device TM. When the engineering support system 1 receives these instructions, extraction rules necessary to extract the simulation model extracted semantic model EM1 are read from the extraction rule database 35 into the semantic model information extraction unit 34. Note that the above simulation model extracted semantic model EM1 is a semantic model necessary to create the simulation model instructed from the terminal device TM (design drawings and the like DD13). Then, according to the read extraction rules, the semantic model information extraction unit 34 performs a process of extracting the simulation model extracted semantic model EM1 necessary to create the instructed simulation model (design drawings and the like DD13) in the instructed range from the combined semantic model CM1.

Figure 10A:
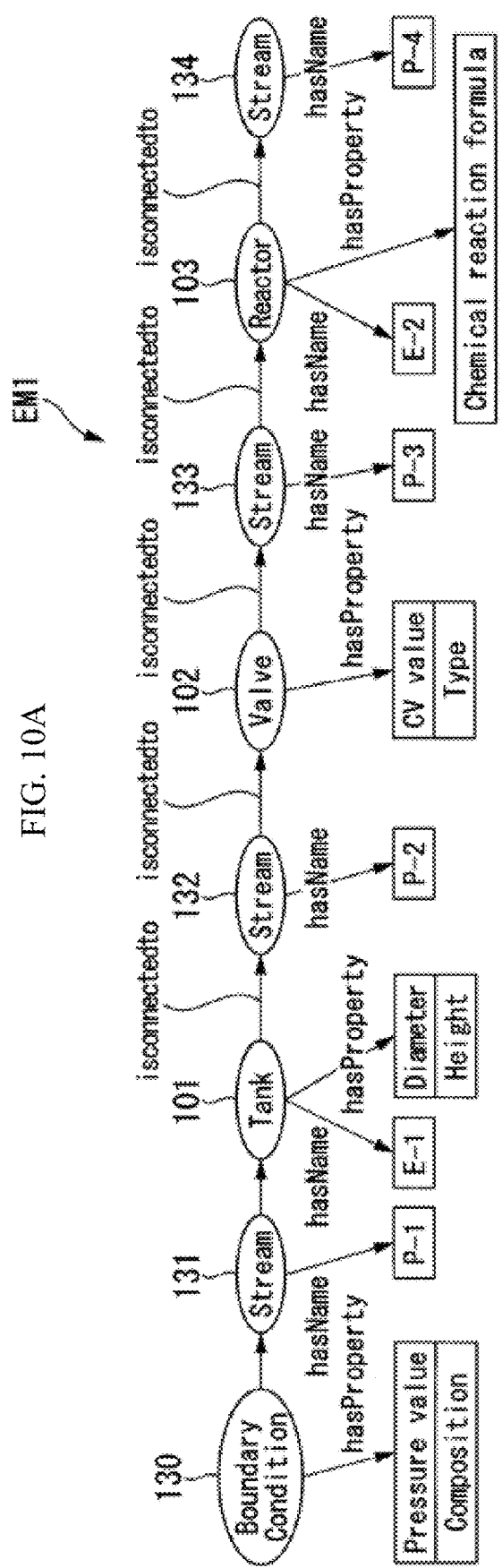
FIGS. 10A and 10B show a diagram for describing an extracted semantic model extracted from the combined semantic model and design drawings and the like generated from this extracted semantic model according to one or more embodiments.

FIG. 10 is a diagram for describing the extracted semantic model extracted from the combined semantic model and the design drawings and the like generated from this extracted semantic model in one or more embodiments. Referring to in FIG. 10A, in the extracted simulation model extracted semantic model EM1, although the tank 101, the valve 102, and the reactor 103 are expressed similarly to the combined semantic model CM1 illustrated in FIG. 9, the piping 111 to 114 are expressed as flows 131 to 134. This is because in the simulation model, an expression as the flows 131 to 134 indicating a flow of the raw material is more appropriate than an expression as the piping 111 to 114 wherethrough the raw material flows.

Note that in the example illustrated in FIG. 10A, nodes illustrating the flows 131 to 134 illustrating the flow of the raw material are tied to information indicating the names of the piping 111 to 114 (hasName). For example, the node illustrating the flow 131 is tied to "P-1," which is information indicating the name of the piping 111 (hasName) and the node illustrating the flow 132 is tied to "P-2," which is information indicating the name of the piping 112 (hasName). This is because the piping 111 to 114 included in the combined semantic model CM1 are expressed as the flows 131 to 134.

Furthermore, in the extracted simulation model extracted semantic model EM1, a node illustrating a boundary condition (Boundary Condition) 130 is added on an upstream side of the flow 131. This is because when performing a simulation using the simulation model, conditions of the raw material supplied as the flow 131 need to be defined. The node illustrating the boundary condition 130 is tied to "Pressure value (Pressure Value)" and "Composition (Composition)" as information indicating properties (hasProperty).

Note that in FIG. 10A, similarly to FIG. 7B, FIG. 8B, and FIG. 9, to facilitate understanding, the simulation model extracted semantic model EM1 is expressed as a diagram wherein nodes and various information are connected by lines (arrows). However, the simulation model extracted semantic model EM1 may be expressed by a markup language such as HTML or XML.

When the process of step S13 illustrated in FIG. 5 is performed, as necessary, an engineer may verify the extracted simulation model extracted semantic model EM1 and, according to verification results, correct the simulation model extracted semantic model EM1. For example, the simulation model extracted semantic model EM1 can be corrected using a function of the semantic model correction unit 42 provided in the application unit 40.

Next, the transformation unit 10 performs a process of transforming the extracted semantic model into design drawings and the like (step S14: second transformation step). Specifically, the converter 11 provided in the transformation unit 10 performs a process of using parts stored in the parts library database 13 to transform the simulation model extracted semantic model EM1 into a simulation model (design drawings and the like DD13) according to the transformation rules stored in the transformation rule database 12 of the transformation unit 10.

More specifically, the simulation model extracted semantic model EM1 is read into the converter 11 and the transformation rules for transforming the simulation model extracted semantic model EM1 into the simulation model (design drawings and the like DD13) are read into the converter 11 from the transformation rule database 12. Then, the converter 11 performs a process of reading, as necessary, the parts stored in the parts library database 13 to convert the simulation model extracted semantic model EM1 into a simulation model (design drawings and the like DD13) according to the read transformation rules.

Figure 10B:
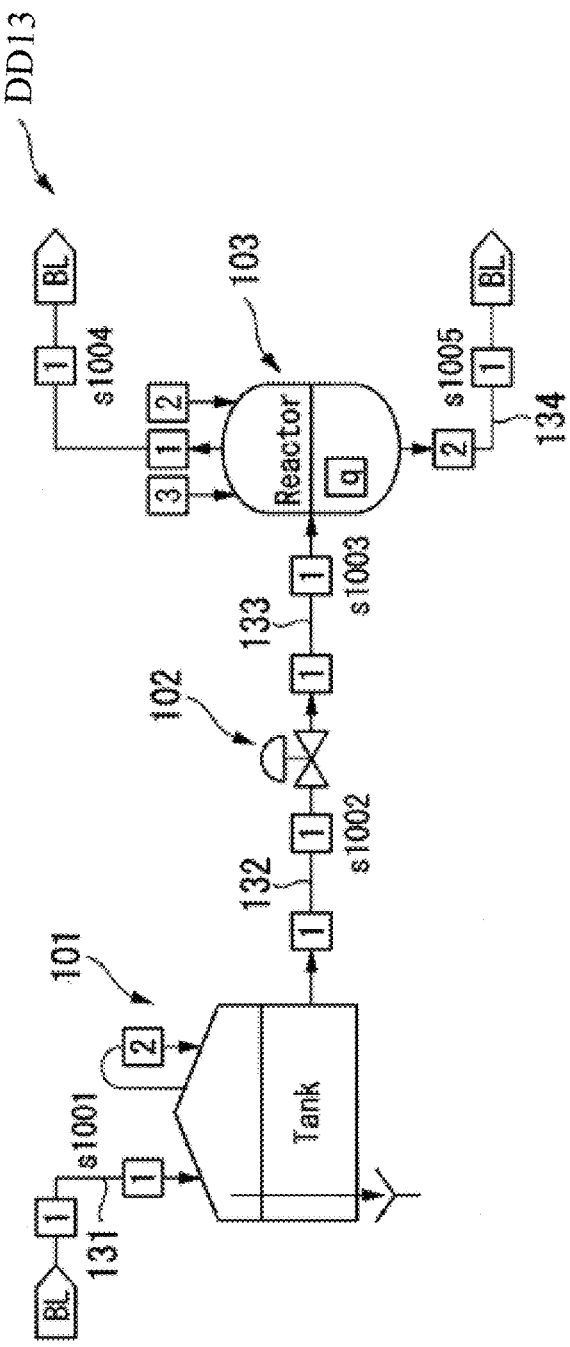

Referring to FIG. 10B, it is understood that a simulation model (design drawings and the like DD13) illustrating the tank 101, the valve 102, and the reactor 103 and the flows 131 to 133 illustrating the flow of the raw material is generated. Specifically, in the simulation model, the tank 101, the valve 102, and the reactor 103 are indicated by reference signs that enable intuitive and ready comprehension. Moreover, in the simulation model, the raw material supplied to the tank 101 is illustrated as the flow 131, the raw material heading from the tank 101 to the valve 102 is illustrated as the flow 132, the raw material heading from the valve 102 to the reactor 103 is illustrated as the flow 133, and a product output from the reactor 103 is illustrated as the flow 134.

When the process of step S14 illustrated in FIG. 5 is performed, as necessary, an engineer may verify the created simulation model (design drawings and the like DD13) and, according to verification results, correct contents of the transformation rule database 12 or the parts library database 13 provided in the transformation unit 10. For example, it is possible to correct the contents of the transformation rule database 12 and the parts library database 13 using a function of the rule database correction unit 41 provided in the application unit 40.

<Applied Operation Examples of Engineering Support System>

<<First Applied Operation Example>>

Figure 11:
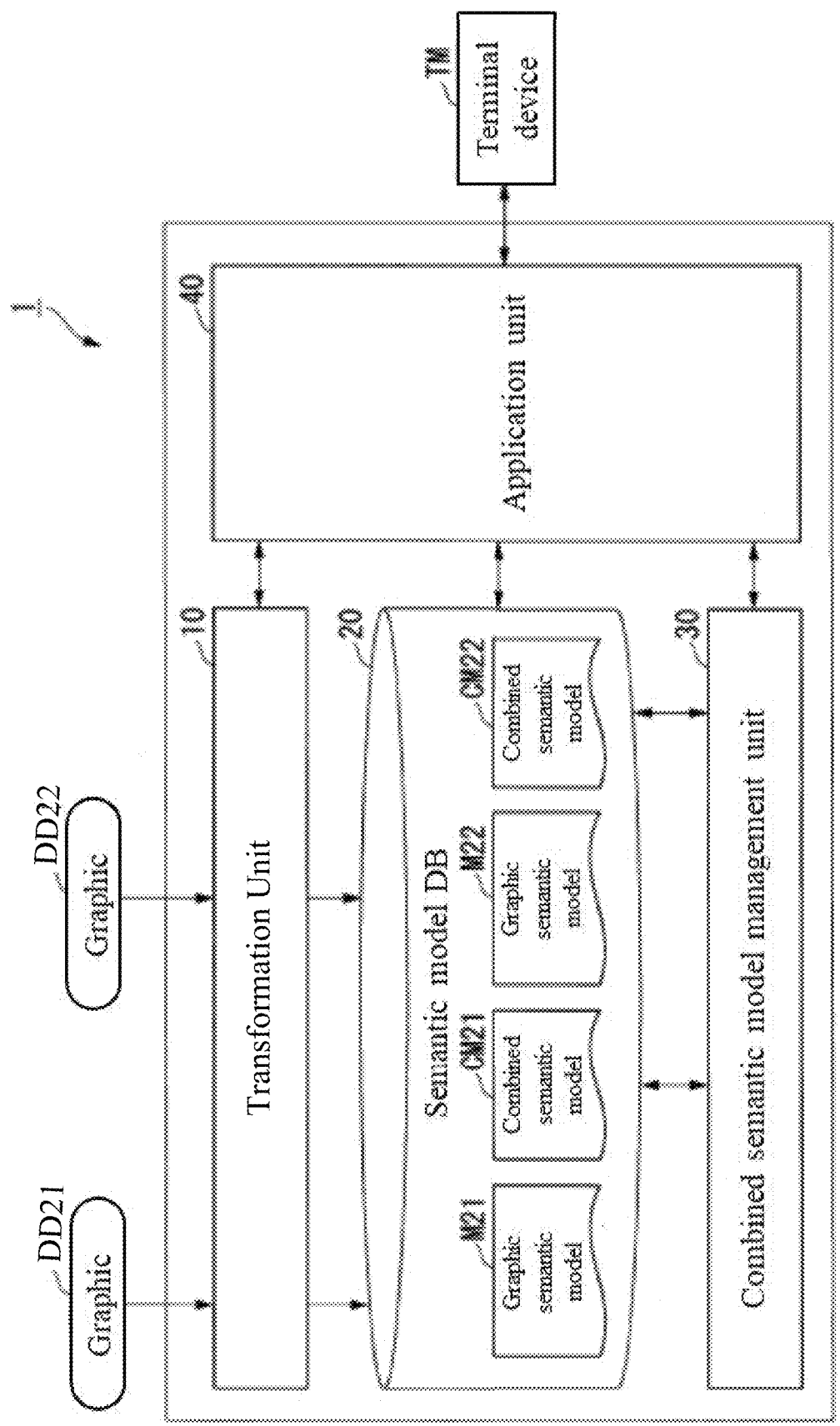
FIG. 11 shows a diagram for describing a first applied operation example according to one or more embodiments.

FIG. 11 is a diagram for describing a first applied operation example in one or more embodiments. The present operation example compares design drawings and the like. In a process control system operated over a long period, design drawings and the like may be corrected during operation or a target range of the design drawings and the like may change somewhat. In such a situation, design drawings and the like created at different times need to be compared. The present operation example is such a comparison of drawings.

In FIG. 11, "Graphic" (design drawings and the like DD21) and "Graphic" (design drawings and the like DD22) illustrate design drawings and the like created at different times. For example, "Graphic" (design drawings and the like DD21) is design drawings and the like created when the process control system starts operation and "Graphic" (design drawings and the like DD22) is design drawings and the like at a current point of the process control system. It is supposed that a graphic semantic model M21 is generated from "Graphic" (design drawings and the like DD21) and a combined semantic model CM21 is generated using this graphic semantic model M21. Moreover, it is supposed that a graphic semantic model M22 is generated from "Graphic" (design drawings and the like DD22) and a combined semantic model CM22 is generated using this graphic semantic model M22.

When the user operates the terminal device TM and, for example, instructs a comparison between the combined semantic model CM21 and the combined semantic model CM22, this instruction is sent from the terminal device TM to the engineering support system 1. When the engineering support system 1 receives the instruction from the terminal device TM, based on the instruction from the terminal device TM, the semantic model comparison unit 45 provided in the application unit 40 performs a process of comparing the combined semantic model CM21 and the combined semantic model CM22 an extracting a difference. Information indicating the difference extracted by the semantic model comparison unit 45 is sent to the terminal device TM and displayed.

In this manner, in the present operation example, when comparing "Graphic" (design drawings and the like DD21) and "Graphic" (design drawings and the like DD22) created at different times, the following comparison is performed. That is, "Graphic" (design drawings and the like DD21) and "Graphic" (design drawings and the like DD22) are not directly compared, and the combined semantic model CM21 and the combined semantic model CM22 are compared. As such, even if, for example, target ranges of "Graphic" (design drawings and the like DD21) and "Graphic" (design drawings and the like DD22) are different, an appropriate comparison result can be obtained. Moreover, even if "Graphic" (design drawings and the like DD21) and "Graphic" (design drawings and the like DD22) are created by different engineering tools, an appropriate comparison result can be obtained.

<<Second Applied Operation Example>>

Figure 12:
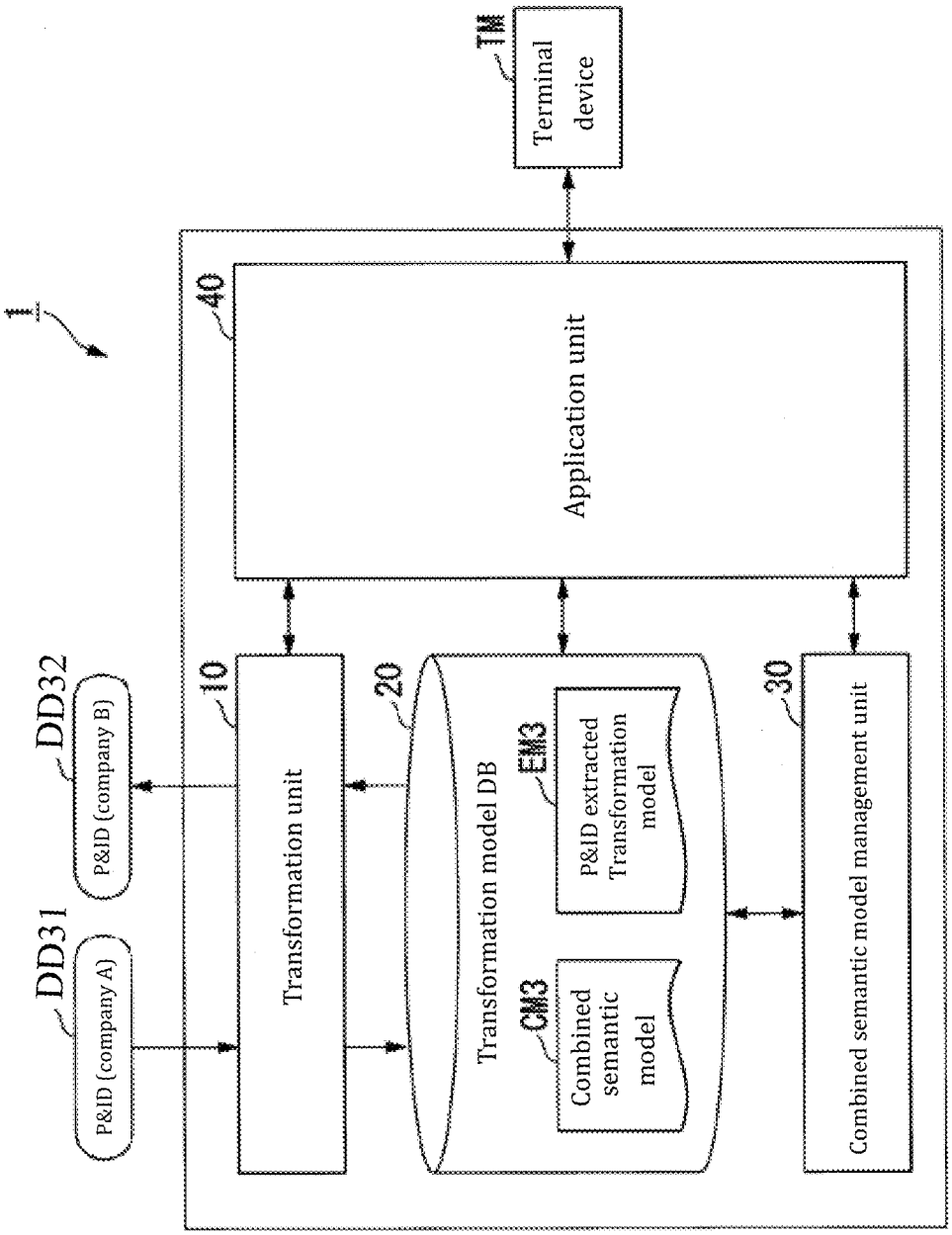
FIG. 12 shows a diagram for describing a second applied operation example according to one or more embodiments.

FIG. 12 is a diagram for describing a second applied operation example in one or more embodiments. The present operation example transforms design drawings and the like. In a process control system operated over a long period, an engineering tool may be changed over the course of operation. This is, for example, a situation wherein an engineering tool of a company A is used in creation of a P&ID when starting operation of the process control system but due to some reason this is changed to an engineering tool of a company B over the course of operation. In such a situation, it is conceivable that past resources can be used effectively if a P&ID created by the engineering tool of company A can be transformed into a P&ID useable by the engineering tool of company B. The present operation example is such a transformation of design drawings and the like.

In FIG. 12, design drawings and the like DD31 illustrate the P&ID created by the engineering tool of company A. Moreover, it is supposed that a semantic model (not illustrated) of the P&ID created by the engineering tool of company A (such as the design drawings and the like DD31) is used to generate a combined semantic model CM3. Moreover, it is supposed that the transformation rule database 12 (see FIG. 2) of the transformation unit 10 stores, in addition to transformation rules for the P&ID and semantic model created by the engineering tool of company A, transformation rules for the P&ID and semantic model created by the engineering tool of company B.

When the user operates the terminal device TM to specify a P&ID to be created (design drawings and the like DD32) and specifies a range of the P&ID to be created (design drawings and the like DD32) to instruct creation of the design drawings and the like, this instruction is sent from the terminal device TM to the engineering support system 1. Then, in the combined semantic model management unit 30 of the engineering support system 1, the semantic model information extraction unit 34 (see FIG. 3) performs a process of extracting a P&ID extracted semantic model EM3 according to the instruction from the terminal device TM from the combined semantic model CM3 according to the extraction rules stored in the extraction rule database 35 (see FIG. 3).

When the P&ID extracted semantic model EM3 is extracted, the transformation rules for the P&ID and semantic model created by the engineering tool of company B are read into the converter 11 from the transformation rule database 12 of the transformation unit 10. Then, according to the read transformation rules, the converter 11 performs a process of transforming the extracted P&ID extracted semantic model EM3 into a P&ID that can be used by the engineering tool of company B (design drawings and the like DD32).

In this manner, in the present operation example, when transforming the P&ID created by the engineering tool of company A (design drawings and the like DD31) into a P&ID that can be used by the engineering tool of company B (design drawings and the like DD32), the design drawings and the like DD31 are not directly transformed into the design drawings and the like DD32, and transformation is performed by the following process. That is, a semantic model (P&ID extracted semantic model EM3) necessary to generate the design drawings and the like DD32 is extracted from the combined semantic model CM3 (combined semantic model generated from the semantic models of the design drawings and the like DD31 and the like). Then, the extracted P&ID extracted semantic model EM3 is transformed into a P&ID (design drawings and the like DD32) that can be used by the engineering tool of company B. As such, even if a target range of the P&ID (design drawings and the like DD32) is narrower or wider than a target range of the P&ID (design drawings and the like DD31), an appropriate P&ID (design drawings and the like DD32) can be generated.

<<Third Applied Operation Example>>

Figure 13:
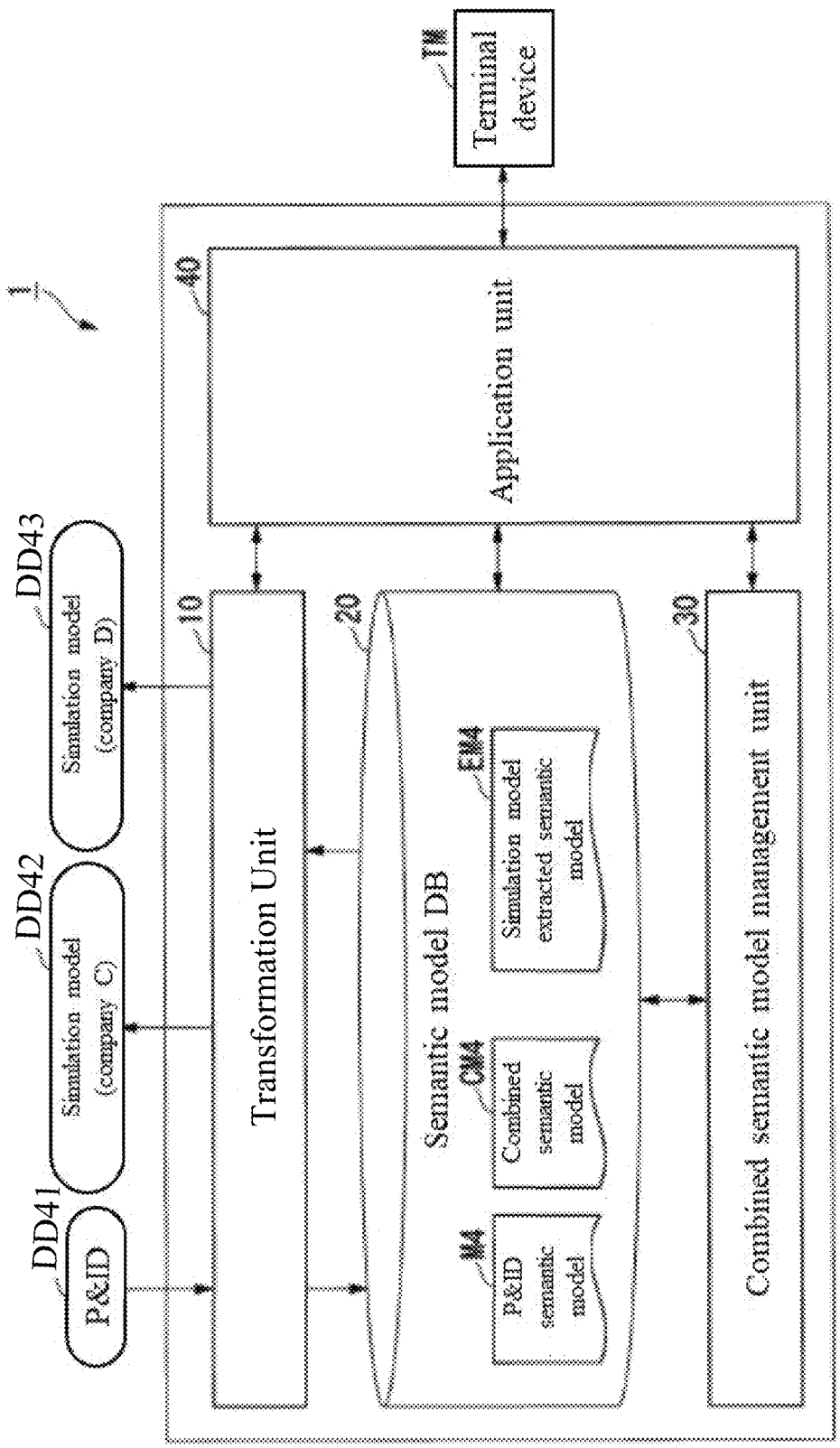
FIG. 13 shows a diagram for describing a third applied operation example according to one or more embodiments.

FIG. 13 is a diagram for describing a third applied operation example in one or more embodiments. The present operation example creates a plurality of different drawings. For example, when a portion of the components of the process control system is changed, design drawings and the like used by a plurality of other engineers may need to be changed. The present operation example creates such a plurality of design drawings and the like.

In FIG. 13, as a P&ID (design drawings and the like DD41), a P&ID is illustrated that is updated by, for example, a change in a portion of the components of the process control system. In the present operation example, to facilitate understanding, an example is described of creating a simulation model suited to a simulator of a company C (design drawings and the like DD42) and a simulation model suited to a simulator of a company D (design drawings and the like DD43) by changing a P&ID (design drawings and the like DD41).

When the user operates the terminal device TM and, for example, instructs transformation of the P&ID (design drawings and the like DD41), this instruction is sent from the terminal device TM to the engineering support system 1. When the engineering support system 1 receives the instruction from the terminal device TM, based on the instruction from the terminal device TM, the transformation unit 10 performs a process of transforming the P&ID (design drawings and the like DD41) into a P&ID semantic model M4. Moreover, the combined semantic model management unit 30 performs a process of combining the transformed P&ID semantic model M4 to the combined semantic model CM4.

Next, when the user operates the terminal device TM to specify a type and conditions of the design drawings and the like DD to be created and specifies a range of the design drawings and the like DD to be created to instruct creation of the design drawings and the like, this instruction is sent from the terminal device TM to the engineering support system 1. In the example illustrated in FIG. 13, the type of the design drawings and the like DD to be created is a "simulation model," and the conditions are "one suited to the simulator of company C" and "one suited to the simulator of company D." This specifies that the design drawings and the like DD to be created are a simulation model suited to the simulator of company C (design drawings and the like DD42) and a simulation model suited to the simulator of company D (design drawings and the like DD43). As the range of the design drawings and the like DD to be created, for example, which portion of the entirety of the plant is specified.

When the engineering support system 1 receives the instruction from the terminal device TM, a process is performed of extracting an extracted semantic model. Specifically, in the combined semantic model management unit 30 of the engineering support system 1, the semantic model information extraction unit 34 (see FIG. 3) performs a process of extracting a simulation model extracted semantic model EM4 according to the instruction from the terminal device TM from the combined semantic model CM3 according to the extraction rules stored in the extraction rule database 35 (see FIG. 3).

When the simulation model extracted semantic model EM4 is extracted, transformation rules for the simulation model (design drawings and the like DD42) and semantic model suited to the simulator of company C and the transformation rules for the simulation model (design drawings and the like DD43) and semantic model suited to the simulator of company D are read into the converter 11 (see FIG. 2) from the transformation rule database 12 (see FIG. 2) of the transformation unit 10. Then, according to the read transformation rules, the converter 11 performs a process of transforming the extracted simulation model extracted semantic model EM4 into a simulation model suited for the simulator of company C (design drawings and the like DD42) and a simulation model suited to the simulator of company D (design drawings and the like DD43).

In this manner, in the present operation example, when the P&ID (design drawings and the like DD41) are updated, the changed P&ID (design drawings and the like DD41) is transformed into the P&ID semantic model M4 to update the combined semantic model CM4. Then, a semantic model (simulation model extracted semantic model EM4) necessary to create a plurality of simulation models (design drawings and the like DD42, DD43) from the updated combined semantic model CM4 is extracted. Then, the extracted simulation model extracted semantic model EM4 is transformed into the simulation model suited to the simulator of company C (design drawings and the like DD42) and the simulation model suited to the simulator of company D (design drawings and the like DD43).

As such, in the present operation example, a plurality of different outputs (the simulation model suited to the simulator of company C [design drawings and the like DD42] and the simulation model suited to the simulator of company D [design drawings and the like DD43]) can be generated from one input (the changed P&ID [design drawings and the like DD41]). Moreover, if necessary, the above plurality of different outputs can also be generated simultaneously.

Note that in the present operation example, the type and range of the design drawings and the like DD to be created are specified after the combined semantic model CM4 is generated. However, a timing of specifying the type and range of the design drawings and the like DD to be created is not limited to after the combined semantic model CM4 is generated. For example, the type and range of the design drawings and the like DD to be created may be specified when, for example, inputting the design drawings and the like DD41 into the engineering support system 1.

<<Fourth Applied Operation Example>>

Figure 14:
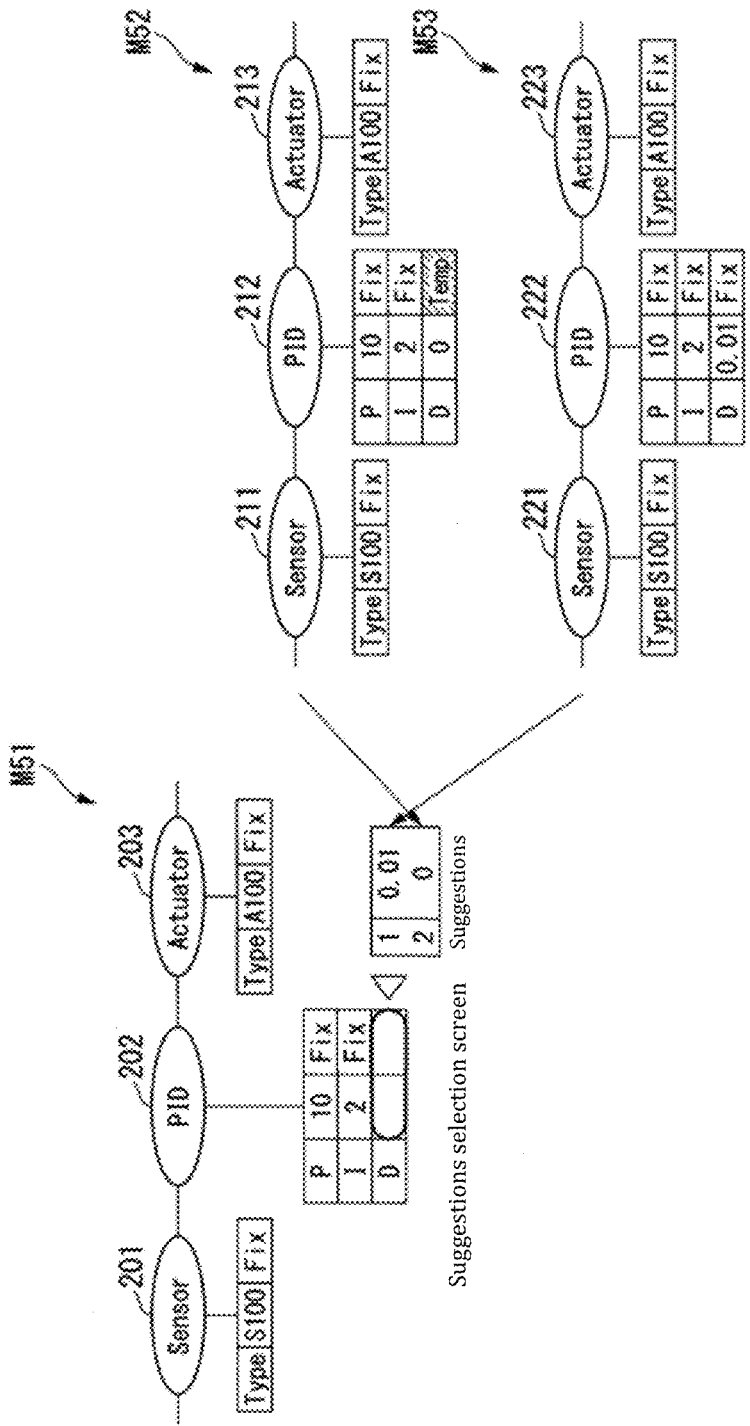
FIG. 14 shows a diagram for describing a fourth applied operation example according to one or more embodiments.

FIG. 14 is a diagram for describing a fourth applied operation example in one or more embodiments. The present operation example flags elements and parameters included in a semantic model. When, for example, building a plant, it is not necessarily the case that all design drawings and the like are completed. Moreover, it is also often the case that preliminary values are set for elements and parameters in the design drawings and the like and these values are confirmed by bouncing them between engineers during the actual building process. The present operation example is one of setting flags of "confirmed," "preliminary," and the like for elements and parameters included in a semantic model.

Note that here, to facilitate understanding, considered is a control system including a sensor, a PID control logic, and an actuator. That is, considered is a control system wherein a measurement result of a sensor is input to the PID control logic, the PID control logic computes an operation amount according to the measurement result of the sensor, and the actuator is operated based on a computation amount computed by the PID control logic.

A semantic model M51 illustrated in FIG. 14 includes a node illustrating a sensor 201, a node illustrating a PID control logic 202, and a node illustrating an actuator 203. Moreover, the node illustrating the PID control logic 202 it tied to a P (proportional) control parameter, an I (integral) control parameter, and a D (differential) control parameter. Each of these parameters can be set with values and flags by the user operating the terminal device TM.

In the example illustrated in FIG. 14, the P control parameter tied to the PID control logic 202 of the semantic model M51 is set with the value "10" and the I control parameter is set with the value "2." Moreover, in the example illustrated in FIG. 14, the P control parameter and the I control parameter are set with a flag "Fix" indicating that the set values are "confirmed."

Here, considered is a situation of the user operating the terminal device TM referring to another semantic model similar to the semantic model M51 in setting the D control parameter tied to the PID control logic 202 of the semantic model M51. It is supposed that the user operating the terminal device TM uses a function of the similar pattern extraction unit 43 provided in the application unit 40 of the engineering support system 1 to instruct extracting a pattern similar to a pattern of the semantic model M51. It is supposed that as a result, a pattern included in a semantic model M52 illustrated in FIG. 14 and a pattern included in a semantic model M53 are extracted.

The semantic model M52 includes a node illustrating a sensor 211, a node illustrating a PID control logic 212, and a node illustrating an actuator 213. Moreover, the node illustrating the PID control logic 212 is tied to a P control parameter, an I control parameter, and a D control parameter. The P control parameter is set with the value "10," the I control parameter is set with the value "2," and the D control parameter is set with the value "0." Moreover, the P control parameter and the I control parameter are set with the flag "Fix" indicating that the set values are "confirmed," and the D control parameter is set with a flag "Temp" indicating that the set value is "preliminary."

The semantic model M53 includes a node illustrating a sensor 221, a node illustrating a PID control logic 222, and a node illustrating an actuator 223. Moreover, the node illustrating the PID control logic 222 is tied to a P control parameter, an I control parameter, and a D control parameter. The P control parameter is set with the value "10," the I control parameter is set with the value "2," and the D control parameter is set with the value "0.01." Moreover, the P control parameter, the I control parameter, and the D control parameter are set with the flag "Fix" indicating that the set values are "confirmed."

Here, among the P control parameter, the I control parameter, and the D control parameter tied to the PID control logic 212 included in the extracted semantic model M52, the D control parameter is set with the flag "Temp" indicating that the set value is "preliminary." In contrast, the P control parameter, the I control parameter, and the D control parameter tied to the PID control logic 222 included in the extracted semantic model M53 are all set with the flag "Fix" indicating that the set values are "confirmed."

As such, on the terminal device TM, in a selection screen for selecting a suggestion for correction (suggestions for correction selection screen), for example, a suggestion for correction of the D control parameter tied to the PID control logic 202 of the semantic model M51, that of the semantic model M53 is displayed higher (with greater priority) than that of the semantic model M52. That is, the value "0.01" of the D control parameter tied to the PID control logic 222 of the semantic model M53 is displayed higher (with greater priority) than the value "0" of the D control parameter tied to the PID control logic 212 of the semantic model M52. The user of the terminal device TM can refer to such display to set parameter values and flags.

Note that when seeking a degree of similarity between semantic models or searching for a similar pattern, those set with the flag "Fix" indicating that the set value is "confirmed" may be used with priority. Moreover, depending on the element or parameter, a value that is optimal at operation commencement of the process control system may no longer be optimal due to operation over a long period. For such an element or parameter, the flag indicating "confirmed" may be set at operation commencement and the flag may afterward be automatically changed to "preliminary" when a pre-established time is elapsed. This information may be used in calculating a degree of similarity when, for example, refurbishing the plant or when prioritizing when searching for a similar pattern.

<Variation>

Figure 15:
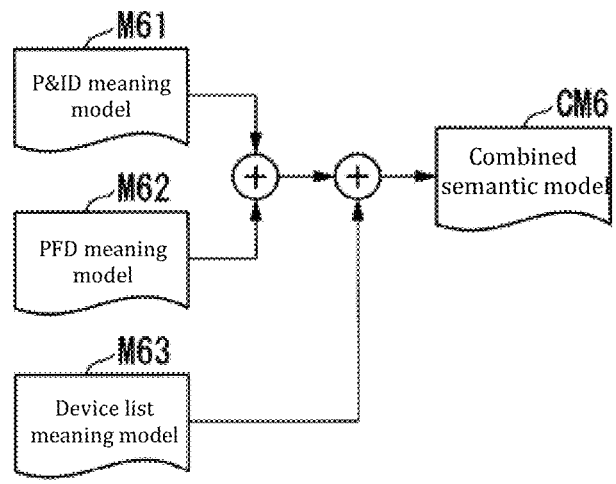
FIG. 15 shows a diagram for describing a first variation of the engineering support system according to one or more embodiments.

FIG. 15 is a diagram for describing a first variation of the engineering support system of one or more embodiments. The embodiments above are mainly described using an example of generating a combined semantic model that combines two semantic models. However, a combined semantic model that combines three or more semantic models may be generated. When combining three or more semantic models, as illustrated in FIG. 15, it may be possible to designate a combining order.

In the example illustrated in FIG. 15, illustrated is an example of generating a combined semantic model CM6 by combining a P&ID semantic model M61, a PFD semantic model M62, and a device list semantic model M63. When combining these semantic models, for example, as illustrated in FIG. 15, first the P&ID semantic model M61 and the PFD semantic model M62 are combined. Then, the combined semantic model, obtained by combining the P&ID model M61 and the PFD semantic model M62, and the device list semantic model M63 are combined to generate the combined semantic model CM6.

Note that the combining order illustrated in FIG. 15 is but one example, and it should be noted that the combining order when combining the P&ID semantic model M61, the PFD semantic model M62, and the device list semantic model M63 is not limited to the order illustrated in FIG. 15. The combining order of the semantic models can be set in any manner in consideration of, for example, the types of the semantic models, the target ranges of the semantic models, and the like.

Figure 16:
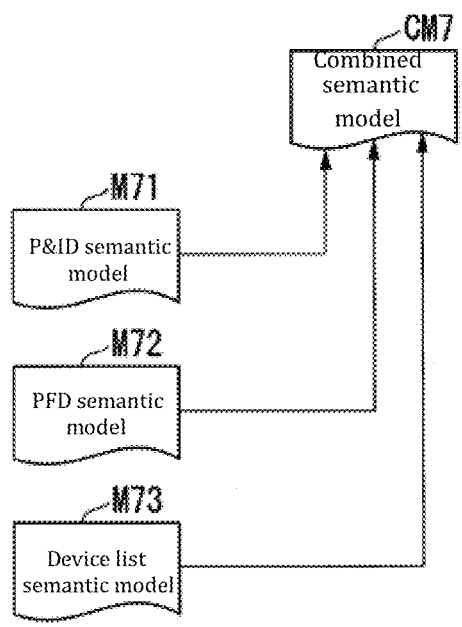
FIG. 16 shows a diagram for describing a second variation of the engineering support system according to one or more embodiments.

FIG. 16 is a diagram for describing a second variation of the engineering support system of one or more embodiments. The one or more embodiments above and the first variation above mainly generate a combined semantic model by combining a plurality of semantic models. The present variation combines a semantic model to a combined semantic model that is already generated.

In the example illustrated in FIG. 16, illustrated is an example of combining a P&ID semantic model M71, a PFD semantic model M72, and a device list semantic model M73 to a combined semantic model CM7 that is already generated. When combining these semantic models to the combined semantic model CM, the user of the terminal device TM designates in order the semantic models to be combined. The order of designating the semantic models is up to the user of the terminal device TM. Note that as with the first variation, the combining order of the semantic models can be set in any manner in consideration of, for example, the types of the semantic models, the target ranges of the semantic models, and the like.

EXAMPLE

Figure 17:
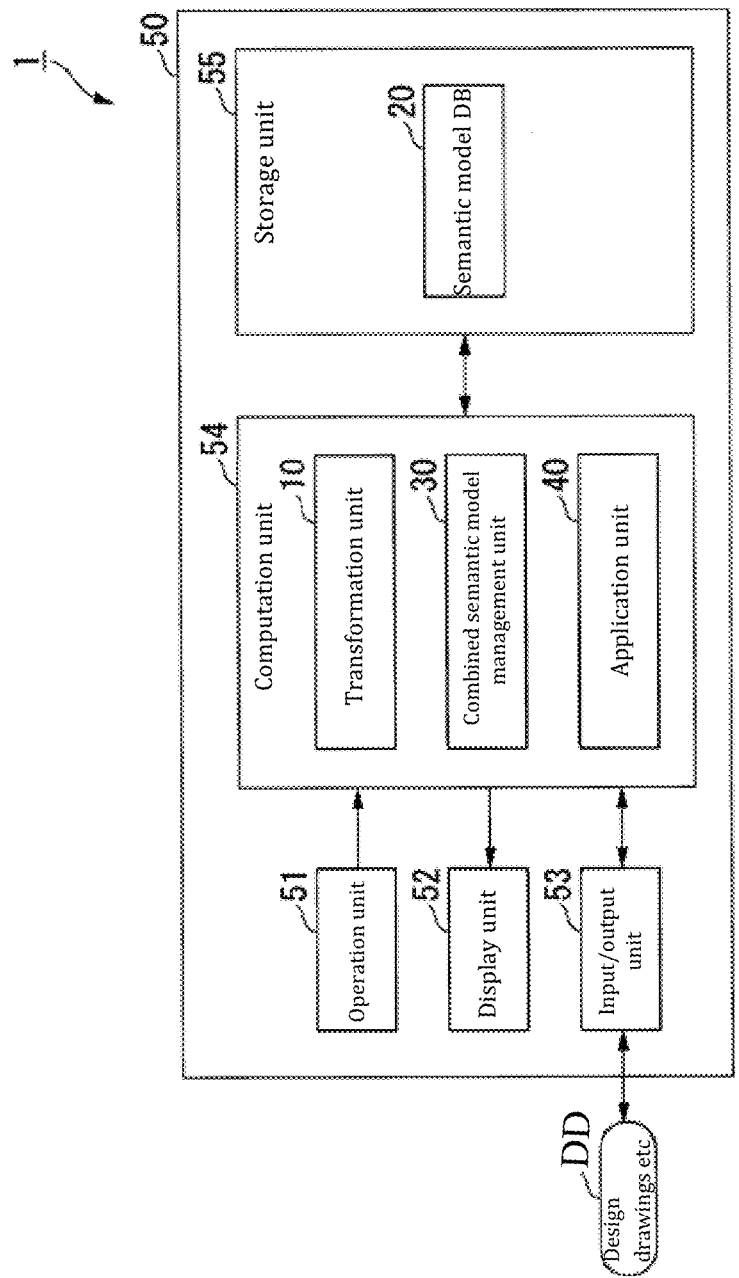
FIG. 17 shows a block diagram illustrating a first example of the engineering support system according to one or more embodiments.

FIG. 17 is a block diagram illustrating a first example of the engineering support system of one or more embodiments. The example illustrated in FIG. 17 is an example of implementing the engineering support system 1 in one computer. As illustrated in FIG. 17, a computer 50 wherein the engineering support system 1 is implemented is provided with an operation unit 51, a display unit 52, an input/output unit 53, a computation unit 54, and a storage unit 55.

The operation unit 51 is provided with input devices such as a keyboard and a pointing device and outputs to the computation unit 54 instructions according to an operation of a user using the engineering support system 1 (instructions for the engineering support system 1). The display unit 52 is provided with a display device such as a liquid-crystal display device and displays various information output from the computation unit 54. Note that the operation unit 51 and the display unit 52 may be physically separated or, as in a touch-panel liquid-crystal display device provided with both a display function and an operation function, physically integrated.

The input/output unit 53 inputs and outputs various information as controlled by the computation unit 54. For example, the input/output unit 53 may input and output various information by communicating with an external device or input and output various information by reading or writing various information from or onto a removable recording medium (for example, a nonvolatile memory). Note that communication with the external device may be any one among wired or wireless communication.

The computation unit 54 performs various computations based on instructions from the operation unit 51 and outputs computation results thereof to the display unit 52 or the input/output unit 53. This computation unit 54 is provided with the transformation unit 10, the combined semantic model management unit 30, and the application unit 40 that are the principal configurations of the engineering support system 1. The functions the computation unit 54 is provided with are realized by a program for realizing these functions being executed by hardware such as a CPU (central processing unit or processor). That is, the functions of the transformation unit 10, the combined semantic model management unit 30, and the application unit 40 are realized by cooperation between software and hardware resources.

The storage unit 55 is provided with an auxiliary storage device such as an HDD (hard disk drive) or an SSD (solid-state drive) and stores various information. For example, the storage unit 55 stores the semantic model database 20, which is an important configuration of the engineering support system 1. Semantic models transformed by the transformation unit 10 and combined semantic models generated by the combined semantic model management unit 30 are stored in the semantic model database 20.

Figure 18:
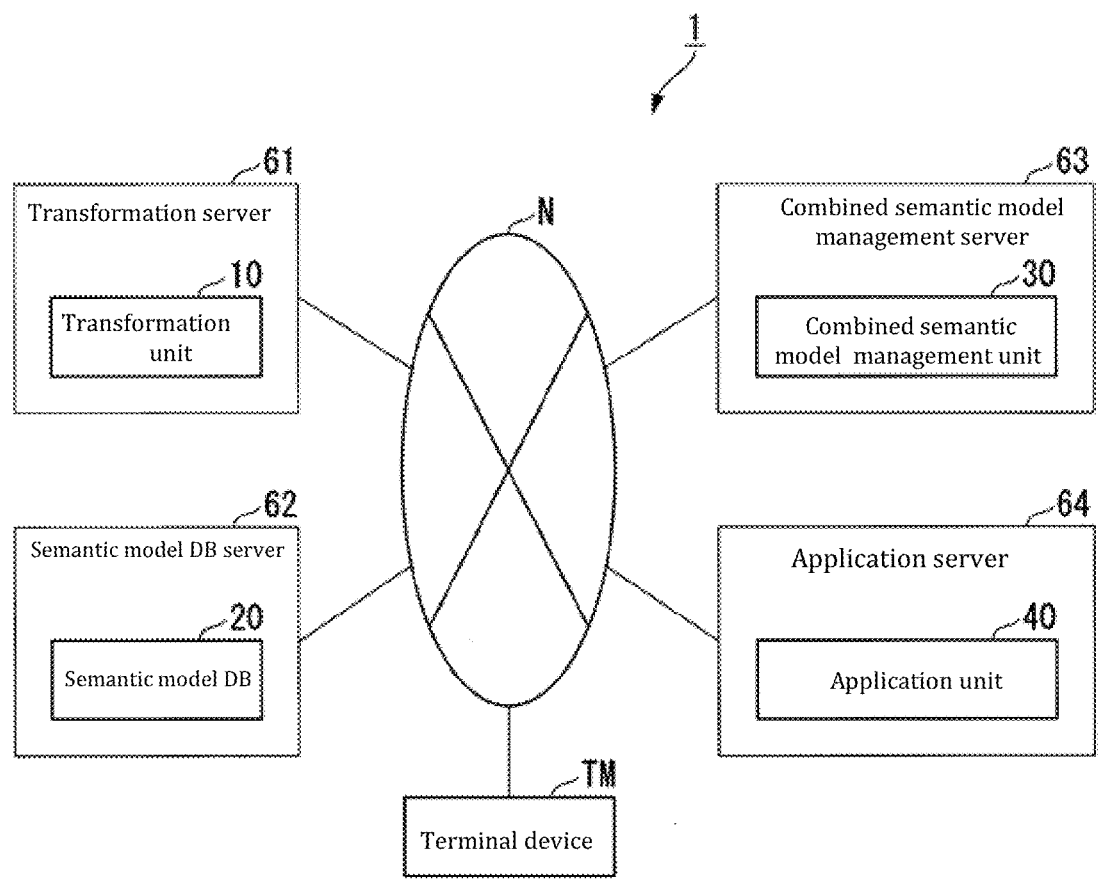
FIG. 18 shows a block diagram illustrating a second example of the engineering support system according to one or more embodiments.

FIG. 18 is a block diagram illustrating a second example of the engineering support system of one or more embodiments. The example illustrated in FIG. 18 is an example of implementing the engineering support system 1 in a plurality of servers connected to a network N. As illustrated in FIG. 18, the engineering support system 1 is realized by a transformation server 61, a semantic model database server 62, a combined semantic model management server 63, and an application server 64.

The transformation server 61 is provided with the transformation unit 10 and provides a function of transforming design drawings and the like into semantic models and transforming semantic models into design drawings and the like. The semantic model database server 62 is provided with the semantic model database 20 and provides a function of storing semantic models and combined semantic models. The combined semantic model management server 63 is provided with the combined semantic model management unit 30 and provides a function of creating combined semantic models by combining semantic models and a function of extracting semantic models from combined semantic models. The application server 64 is provided with the application unit 40 and provides functions that are useful for the engineering support system 1 to manage the design drawings and the like DD. Note that details of these functions are already described and thus not described here.

Note that FIG. 18 illustrates an example wherein the transformation unit 10, the semantic model database 20, the combined semantic model management unit 30, and the application unit 40 provided by the engineering support system 1 are respectively provided in individual servers. However, among the transformation unit 10, the semantic model database 20, the combined semantic model management unit 30, and the application unit 40 provided by the engineering support system 1, two or three may be provided in one server. For example, the semantic model database 20 and the combined semantic model management unit 30 may be provided in one server.

As described above, in the present embodiments, design drawings and the like used in engineering a process control system are transformed into a semantic model expressed by first information indicating elements included in these design drawings and the like and second information indicating relationships between the elements, and a combined semantic model combining a plurality of semantic models is generated based on a degree of similarity between a plurality of semantic models. As such, design drawings and the like needed by a plurality of engineers involved in engineering can be imparted meaning and aggregated.

Furthermore, according to the present embodiments, a semantic model according to an instruction is extracted from a combined semantic model, and the extracted semantic model is transformed into design drawings and the like. This enables any design drawings and the like needed by an engineer involved in engineering to be obtained.

In this manner, in the present embodiments, design drawings and the like reflecting an actual state of a process control system are imparted meaning and integrated. This enables working efficiency to be significantly improved because it can be said that design drawings and the like used in engineering are sufficiently shared among engineers involved in engineering.

An engineering support system and an engineering support method of one or more embodiments are described above. However, one or more embodiments is not limited to the above embodiments and can be changed freely within the scope of one or more embodiments. For example, in the above operation examples of the engineering support system 1 (basic operation example and first to third applied operation examples), to facilitate understanding, specific design drawings and the like were illustrated in the description. However, design drawings and the like able to be handled in the operation examples of the engineering support system 1 are not limited to the illustrated design drawings and the like, and any design drawings and the like can be handled.

For example, in the second applied operation example, an example is described of transforming a P&ID created by an engineering tool of a company A (design drawings and the like DD31) into a P&ID useable by an engineering tool of a company B (design drawings and the like DD32), but transformation similar to that of the P&ID can be performed for any design drawings and the like other than a P&ID. Moreover, in the second applied operation example, the P&ID created by the engineering tool of company A can be output as a simulation model for a simulator made by company A, for which compatibility can be anticipated, or transformed into a simulation model for a simulator made by company B, for which compatibility cannot be anticipated.

Furthermore, the engineering support system 1 may be realized by cloud computing. Here, cloud computing may be computing matching the definitions described in the documents specified by the following URLs (Uniform Resource Locators) (definitions recommended by the National Institute of Standards and Technology):

http://nvlpubs.nist.gov/nistpubs/Legacy/SP/nistspecialpublication800-145.pdf https://www.ipa.go.jp/files/000025366.pdf Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Engineering support system
10 Transformation unit
12 Transformation rule database
20 Semantic model database
31 Combined semantic model generation unit
32 Matching unit
33 Matching rule database
34 Semantic model information extraction unit
35 Extraction rule database
40 Application unit
CM Combined semantic model
EM Extracted semantic model
DD Design drawings and the like
M Semantic model

What is claimed is:

1. An engineering support system that supports engineering of a process control system, comprising:
    a storage; and
    a processor connected to the storage and that:
        transforms design drawings into semantic models and outputs the semantic models to the storage; and
        generates a combined semantic model by combining the semantic models based on a degree of similarity among the semantic models and outputs the combined semantic model to the storage, wherein
    each of the semantic models is expressed by first information indicating elements included in the design drawings and second information indicating a relationship between the elements,
    the engineering support system further comprises a third database that stores extraction rules for extracting an extracted semantic model from the combined semantic model,
    the processor extracts the extracted semantic model from the combined semantic model according to an instruction and the extraction rules, and
    the processor creates design drawings based on a type and a range of the instruction using the extracted semantic model.

2. The engineering support system of claim 1, wherein the processor calculates the degree of similarity.

3. The engineering support system of claim 2, further comprising:
    a first database that stores calculation rules for calculating the degree of similarity, wherein
    the processor calculates the degree of similarity among the semantic models according to the calculation rules.

4. The engineering support system of claim 1, wherein the degree of similarity indicates a degree of similarity among a plurality of the first information included in the semantic models and a degree of similarity among a plurality of the second information included in the semantic models.

5. The engineering support system of claim 1, wherein the first information includes information indicating names of the elements and information indicating properties of the elements.

6. The engineering support system of claim 1, further comprising:
    a second database that stores transformation rules for transforming between the design drawings and the semantic models, wherein
    the processor transforms a semantic model into the design drawings according to the transformation rules.

7. The engineering support system of claim 1, further comprising: an application that corrects a semantic model, supports correction of the semantic model, compares the semantic models, or compares combined semantic models.

8. An engineering support method of supporting engineering of a process control system, the method being executed by a processor and comprising:
    transforming design drawings into semantic models;
    generating a combined semantic model that combines the semantic models based on a degree of similarity among the semantic models;
    reading extraction rules from a database for extracting an extracted semantic model from the combined semantic model;
    extracting the extracted semantic model from the combined semantic model according to an instruction and the extraction rules; and
    creating design drawings based on a type and a range of the instruction using the extracted semantic model, wherein
    each of the semantic models is expressed by:
        first information indicating elements included in the design drawings; and
        second information indicating a relationship between the elements.

* * * * *